US009420169B2

(12) United States Patent
Uemura et al.

(10) Patent No.: US 9,420,169 B2
(45) Date of Patent: Aug. 16, 2016

(54) IMAGING DEVICE, IMAGING METHOD, AND PROGRAM

(71) Applicant: OLYMPUS CORPORATION, Hachioji-shi, Tokyo (JP)

(72) Inventors: Tomomi Uemura, Jakarta (ID); Mai Yamaguchi, Hachioji (JP); Yuiko Uemura, Hachioji (JP); Sachie Yamamoto, Hino (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/607,669

(22) Filed: Jan. 28, 2015

(65) Prior Publication Data
US 2015/0207985 A1    Jul. 23, 2015

Related U.S. Application Data

(63) Continuation of application No. PCT/JP2014/065904, filed on Jun. 16, 2004.

(30) Foreign Application Priority Data

Oct. 30, 2013    (JP) .................................. 2013-225658

(51) Int. Cl.
*H04N 5/232* (2006.01)
*H04N 5/265* (2006.01)
(Continued)

(52) U.S. Cl.
CPC ............... *H04N 5/23219* (2013.01); *G03B 7/00* (2013.01); *G03B 15/00* (2013.01); *G03B 17/02* (2013.01);
(Continued)

(58) Field of Classification Search
CPC .......... H04N 5/23293; H04N 5/23222; H04N 5/265; H04N 5/23256; H04N 5/2621; H04N 5/2322
USPC ................. 348/207.11, 208.6, 208.14, 211.2, 348/218.1, 239, 333.03, 333.04
See application file for complete search history.

(56) References Cited

U.S. PATENT DOCUMENTS

6,606,117 B1 *   8/2003   Windle ............... H04N 1/00183
                                                      348/222.1
8,698,937 B2 *   4/2014   Jeong .................. H04N 5/23293
                                                      348/207.99

(Continued)

FOREIGN PATENT DOCUMENTS

JP      2003-037826 A      2/2003
JP      2005-156942        6/2005

(Continued)

OTHER PUBLICATIONS

Decision of a Patent Grant mailed on Jan. 5, 2016 in corresponding Japanese Patent Application No. 2015-028630, consisting of 3 pp. (English Translation Provided).

(Continued)

*Primary Examiner* — Hung Lam
(74) *Attorney, Agent, or Firm* — Volpe and Koenig, P.C.

(57) ABSTRACT

An imaging device includes: an imaging unit imaging an object and generating image data of the object; a display unit displaying an image corresponding to the image data; a display controller controlling the display unit to display an expression guide image in which at least a part of expression of a face in the object has been changed; an expression determination unit determining similarity between the expressions in the image and in the expression guide image; an imaging controller controlling the imaging unit to continuously image the object until the expression determination unit determines that the expressions in the image and in the expression guide image are matched, wherein the display controller controls the display unit to display another expression guide image at a time the expression determination unit determines that the expressions in the image in the expression guide image are matched.

10 Claims, 28 Drawing Sheets

(51) Int. Cl.
  G03B 7/00 (2014.01)
  G03B 15/00 (2006.01)
  G03B 17/02 (2006.01)
  G03B 17/18 (2006.01)
  G06K 9/00 (2006.01)
  H04N 5/262 (2006.01)

(52) U.S. Cl.
  CPC ............ G03B 17/18 (2013.01); G06K 9/00221 (2013.01); G06K 9/00302 (2013.01); H04N 5/23293 (2013.01); H04N 5/265 (2013.01); H04N 5/2621 (2013.01)

(56) References Cited

U.S. PATENT DOCUMENTS

| | | | | |
|---|---|---|---|---|
| 8,786,754 B2* | 7/2014 | Narita | ................ | H04N 4/23219 348/333.12 |
| 9,232,124 B2* | 1/2016 | Song | .................... | H04N 5/2251 |
| 2005/0088542 A1* | 4/2005 | Stavely | .............. | H04N 5/23222 348/239 |
| 2007/0298897 A1* | 12/2007 | Kiraly | ................ | A63B 24/0003 473/131 |
| 2009/0208135 A1* | 8/2009 | Endo | .................. | H04N 5/23219 382/284 |
| 2013/0222644 A1 | 8/2013 | Son et al. | | |

FOREIGN PATENT DOCUMENTS

| | | |
|---|---|---|
| JP | 2006-074368 | 3/2006 |
| JP | 2010-109567 | 5/2010 |
| JP | 2013-175802 | 9/2013 |
| JP | 2013-182616 | 9/2013 |

OTHER PUBLICATIONS

Decision of a Patent Grant issued in corresponding Japanese Patent Application No. 2014-556870 on Jan. 20, 2015, consisting of 4 pp. (English Translation Provided).

International Search Report mailed in corresponding International Patent Application No. PCT/JP2014/065904 on Sep. 9, 2014, consisting of 7 pp.

* cited by examiner (a)

(b)

(c)

IMAGING DEVICE, IMAGING METHOD, AND PROGRAM

CROSS REFERENCES TO RELATED APPLICATIONS

This application is a continuation of PCT international application Ser. No. PCT/JP2014/065904 filed on Jun. 16, 2014 which designates the United States, incorporated herein by reference, and which claims the benefit of priority from Japanese Patent Applications No. 2013-225658, filed on Oct. 30, 2013, incorporated herein by reference.

BACKGROUND OF THE INVENTION

1. Field of the Invention

The present invention relates to an imaging device, an imaging method, and a program for displaying an image corresponding to image data or capturing advice related to capturing an image.

2. Description of the Related Art

In recent years, in imaging devices such as digital cameras, a technology is known, which is capable of revolving a display screen of a display monitor that displays an image, around a main body that generates image data from a photographer side to an object side (see Japanese Patent Application Laid-open No. 2013-175802). This technology enables a photographer to perform self-photographing to capture himself/herself as an object by revolving the display monitor from the photographer side to the object side.

However, in the technology described in Japanese Patent Application Laid-open No. 2013-175802, the object gets conscious about the image device, and creates a pose and an expression when being captured, and thus monotonous images tend to be captured.

SUMMARY OF THE INVENTION

An imaging device according to one aspect of the present invention includes: an imaging unit configured to image an object and generate image data of the object; a display unit configured to display an image corresponding to the image data generated by the imaging unit; a display controller configured to control the display unit to display an expression guide image in which at least a part of expression of a face in the object has been changed; an expression determination unit configured to determine similarity between the expression of the face in the object in the image corresponding to the image data generated by the imaging unit and the expression of the face in the object in the expression guide image displayed by the display unit; an imaging controller configured to control the imaging unit to continuously image the object until the expression determination unit determines that the expression of the face in the object in the image and the expression of the face in the object in the expression guide image are matched, wherein the display controller is configured to control the display unit to display another expression guide image at a time the expression determination unit determines that the expression of the face in the object in the image and the expression of the face in the object in the expression guide image are matched.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
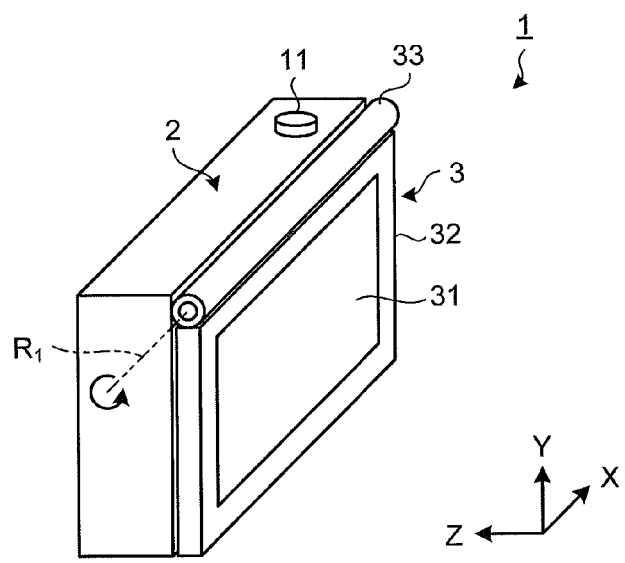
FIG. 1 is a perspective view illustrating a configuration of a side of an imaging device, the side facing a photographer, according to a first embodiment of the present invention.

Hereinafter, embodiments for implementing the present invention (hereinafter, referred to as "embodiments") will be described with reference to the drawings. Further, hereinafter, an example of an imaging device that mounts a display device will be described. Note that the present invention is not limited by the embodiments below. Further, description will be given, denoting the same parts with the same reference signs in the drawings.

First Embodiment

Figure 2:
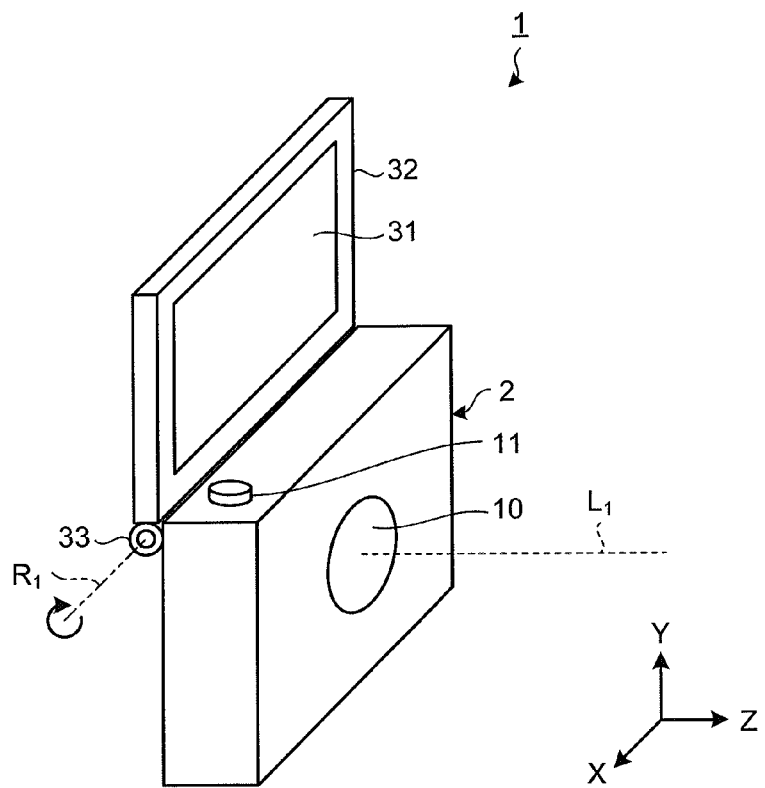
FIG. 2 is a perspective view illustrating a configuration of a side of the imaging device, the side facing an object, according to the first embodiment of the present invention.
Figure 3:
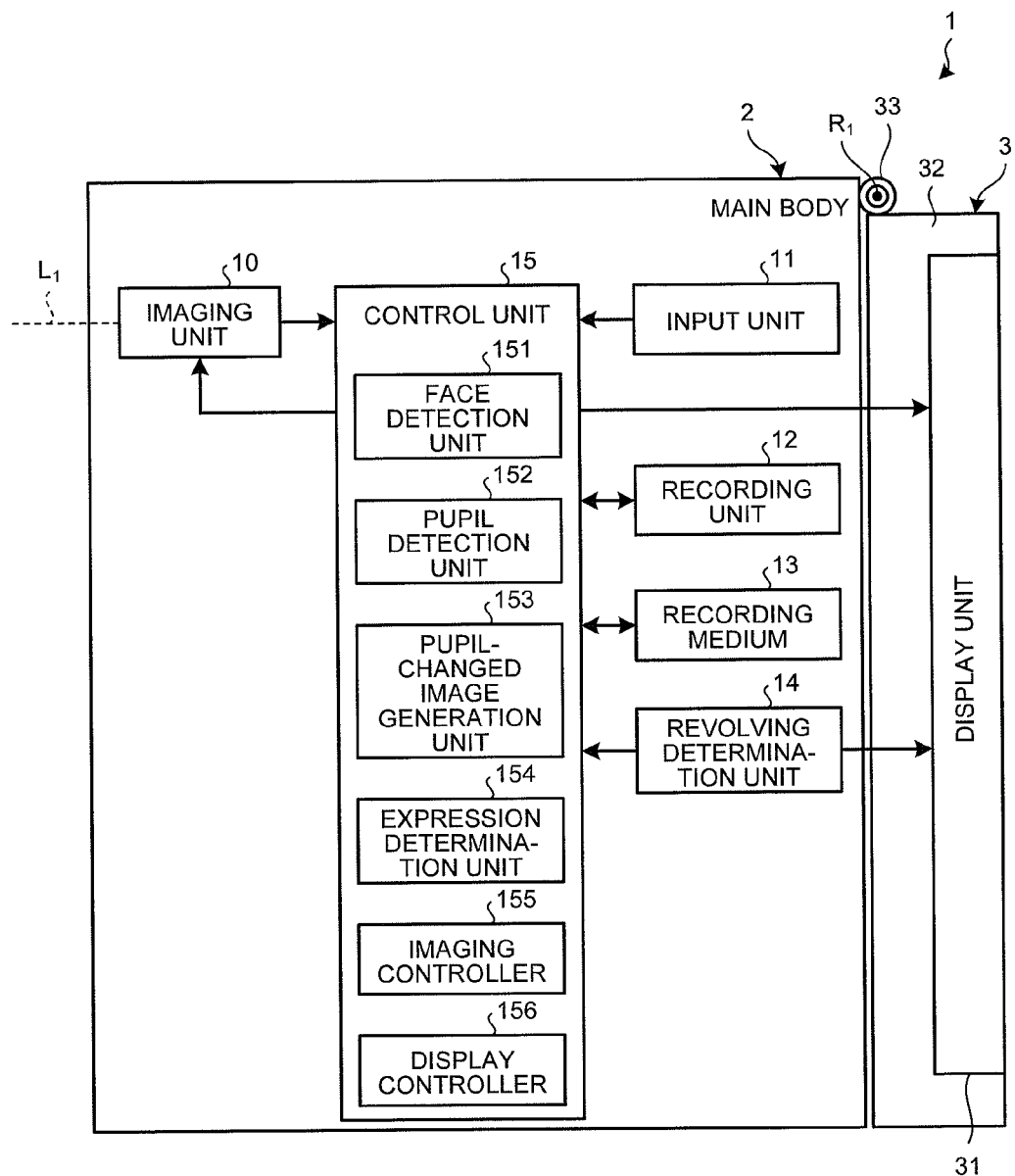
FIG. 3 is a block diagram illustrating a functional configuration of the imaging device according to the first embodiment of the present invention.

FIG. 1 is a perspective view illustrating a configuration of a side (back surface side) of an imaging device, the side facing a photographer, according to the present invention. FIG. 2 is a perspective view illustrating a side (front surface side) of the imaging device, the side facing an object, according to the present invention. FIG. 3 is a block diagram illustrating a functional configuration of the imaging device according to the present invention. Note that, in FIGS. 1 and 2, description will be given where a width direction of an imaging device 1 is an X axis, a height direction of the imaging device 1 is a Y axis, and a direction of an optical axis $L_1$ of the imaging device 1 is a Z axis.

The imaging device 1 illustrated in FIGS. 1 to 3 includes a main body 2 that captures an object and generates image data of the object, and a display mechanism 3 rotatably provided to the main body 2 from the photographer side (back surface side) to the object side (front surface side), and capable of displaying an image corresponding to the image data generated by the main body 2.

First, a configuration of the main body 2 will be described. The main body 2 includes an imaging unit 10, an input unit 11, a recording unit 12, a recording medium 13, a revolving determination unit 14, and a control unit 15.

The imaging unit 10 continuously images a predetermined visual field area at a predetermined frame rate (for example, 30 fps) under control of the control unit 15, and generates a plurality of temporally continuous image data. The imaging unit 10 is configured from a plurality of lenses, an optical system that focuses an object image, a diaphragm that adjusts a quantity of light of the optical system, an imaging element such as a charge coupled device (CCD) or a complementary metal oxide semiconductor (CMOS) that receives the object image focused by the optical system and performs photoelectric conversion to generate image data, a shutter that sets a state of the imaging element to an exposure state or a shading state, a signal processing unit that applies predetermined analog processing to the image data generated by the imaging element, an A/D converter that applies A/D conversion to analog image data input from the signal processing unit to generate digital image data, and outputs the digital image data to the control unit 15, and a timing generator that generates imaging timing of the imaging element.

The input unit 11 receives an input of an instruction signal that instructs various operations related to the imaging device 1. The input unit 11 is configured from a power supply switch that switches a power supply state of the imaging device 1 to an ON state or an OFF state, a release switch that receives an input of a release signal that instructs capturing an image to the imaging device 1, and the like.

The recording unit 12 records image data input through the control unit 15, information in processing by the imaging device 1, various programs for operating the imaging device 1, a program according to the first embodiment, various data used during execution of the program, and the like. The recording unit 12 is configured from a synchronous dynamic random access memory (SDRAM), a flash memory, and the like.

The recording medium 13 records image data input through the control unit 15. The recording medium 13 is configured from a memory card mounted from an outside of the main body 2, and the like, and is detachably attached to the main body 2 through a memory I/F (not illustrated). Image data and moving image data, to which processing has been applied by the control unit 15 described below, are written in the recording medium 13. Further, the image data or the moving image data recorded by the control unit 15 is read from the recording medium 13.

The revolving determination unit 14 determines a revolving state of the display mechanism 3, and outputs a determination result to the control unit 15. To be specific, the revolving determination unit 14 determines whether a display area of a display unit 31 of the display mechanism 3 is rotated to the front surface side with respect to the main body 2, and the display area of the display unit 31 faces the front surface side (object side), and outputs a determination result to the control unit 15.

The control unit 15 transfers instructions and data corresponding to respective units that configure the imaging device 1 to comprehensively control an operation of the imaging device 1. The control unit 15 is configured from a central processing unit (CPU), and the like.

Here, a detailed configuration of the control unit 15 will be described. The control unit 15 includes a face detection unit 151, a pupil detection unit 152, a pupil-changed image generation unit 153, an expression determination unit 154, an imaging controller 155, and a display controller 156.

The face detection unit 151 detects a face of an object in an image corresponding to image data generated by the imaging unit 10. To be specific, the face detection unit 151 detects a face of a person included in an image corresponding to image data generated by the imaging unit 10 with pattern matching. For example, the face detection unit 151 detects a position of the face in the image using pattern matching, and then detects positions of characteristic points of the face such as eyes, a nose, and a mouth, thereby to detect a position of the face, a size (an area) of the face, a direction of the face, an angle (an inclination) of the face, and an expression (a smiling face, or the like) of the face. Note that the face detection unit 151 may detect not only a face of a person, but also a face of an animal such as a dog or a cat. Further, the face detection unit 151 may detect a face of a person using a known technology, other than the pattern matching.

The pupil detection unit 152 detects pupils of the face in the object detected by the face detection unit 151. To be specific, the pupil detection unit 152 detects the pupils (a pupil area) by applying predetermined processing such as grayscale processing to the eyes (an eye area) of the face in the object detected by the face detection unit 151, and then performing binarization processing.

The pupil-changed image generation unit 153 generates pupil-changed image data in which a position of the pupil area in a sclera area (an area of white of the eyes) of the object has been changed, based on a detection result detected by the pupil detection unit 152. To be specific, the pupil-changed image generation unit 153 applies trimming processing to the pupil area detected by the pupil detection unit 152 to generate a pupil image, and superimposes the pupil image on a predetermined area of the sclera area, for example, on a right end portion, and applies interpolating processing of interpolating pixels of white or a surrounding sclera area into the pupil area to which the trimming processing has been applied, thereby to generate the pupil-changed image data in which a line of sight of the object has been changed. For example, in a case where positions of pupils of an object detected by the pupil detection unit 152 are in the front (center), the pupil-changed image generation unit 153 moves the pupils to the right and left to generate two pupil-changed image data having lines of sight different from each other. Note that the pupil-changed image generation unit 153 may generate the pupil-changed image data in which the lines of sight of the object have been changed, based on outlines of respective parts of the face detected by the face detection unit 151 and the pupils detected by the pupil detection unit 152, using morphing processing of a known technology.

The expression determination unit 154 determines similarity between an expression of the object in an image corresponding to the image data generated by the imaging unit 10 and an expression of the face in the object in an expression guide image displayed in the display unit 31 described below. To be specific, the expression determination unit 154 determines whether the degree of similarity between the expression of the object in the image corresponding to the image data generated by the imaging unit 10 and the expression of the face in the object in the expression guide image displayed in the display unit 31 described below falls within a predetermined range. To be specific, the expression determination unit 154 determines whether characteristic points of respective parts of the object in the expression guide image, for example, the eyes, the nose, the mouth, the direction of the face, the position of the face, the size of the face, the angle of the face, and the like, and characteristic points of the respective parts of the object in the image corresponding to the image data generated by the imaging unit 10 are approximately matched. Note that the expression determination unit 154 may determine only whether the positions of the pupils in the sclera area of the object are matched. Further, the expression determination unit 154 may determine whether the expression of the object in the image corresponding to the image data generated by the imaging unit 10 and the expression of the face in the object in the expression guide image displayed in the display unit 31 described below are matched.

When a release signal has been input from the input unit 11, the imaging controller 155 performs control of starting a capturing operation in the imaging device 1. Here, the capturing operation in the imaging device 1 is to record the image data generated by the imaging unit 10 in the recording medium 13. Further, when an instruction signal that instructs capturing a moving image has been input from the input unit 11, the imaging controller 155 creates a moving image file in the recording medium 13, and sequentially records (stores), in the moving image file, image data sequentially generated by the imaging unit 10. Further, the imaging controller 155 controls imaging of the imaging unit 10 based on a determination result of the expression determination unit 154. To be specific, the imaging controller 155 causes the imaging unit 10 to continuously image the object until the expression determination unit 154 determines the expression of the object in the image corresponding to the image data generated by the imaging unit 10 and the expression of the object in the expression guide image described below are matched.

The display controller 156 displays the image corresponding to the image data in the display unit 31 of the display mechanism 3 described below. When capturing the object, the display controller 156 displays, in the display unit 31, an expression guide image in which at least a part of the expression of the face in the object has been changed, as capturing advice. Here, the expression guide image is an object image obtained such that the line of sight looking at the front is changed into a line of sight looking at a direction other than the front. To be specific, the display controller 156 displays, in the display unit 31 of the display mechanism 3 described below, an image corresponding to the image data in which the positions of the pupils of the object generated by the pupil-changed image generation unit 153 have been changed. Further, when the expression determination unit 154 has determined that the expression of the object in the image corresponding to the image data generated by the imaging unit 10 and the expression of the object in the expression guide image described below are approximately matched, the display controller 156 displays a different expression guide image in the display unit 31. If an own face image is processed and displayed, a probability of matching is increased. However, an avatar may be displayed.

Next, a configuration of the display mechanism 3 will be described. The display mechanism 3 includes the display unit 31, a movable unit 32, and a revolving support unit 33.

The display unit 31 displays an image corresponding to the image data input through the control unit 15 under control of the control unit 15. Here, the display of an image includes a rec-view display that displays image data immediately after captured for a predetermined time (for example, three seconds), a playback display that plays back the image data recorded in the recording medium 13, a live view display that sequentially displays live view images corresponding to the image data continuously generated by the imaging unit 10 in time series, and the like. The display unit 31 is configured from a display panel made of liquid crystal or organic EL, a drive driver, and the like. Further, the display unit 31 appropriately displays operation information of the imaging device 1 and information related to capturing an image. Further, the display unit 31 is rotatably provided to the main body 2 of the imaging device 1 from the back surface side of the imaging device 1 to the front surface side of the imaging device 1 (see FIG. 1→FIG. 2).

The movable unit 32 includes the display unit 31, and is rotatably provided to the main body 2 around one end of the main body 2 through the revolving support unit 33 such as a hinge. To be specific, the movable unit 32 is rotatably provided from the back surface side to the front surface side of the main body 2 around an axis $R_1$ of the revolving support unit 33 (see FIG. 2).

Figure 4:
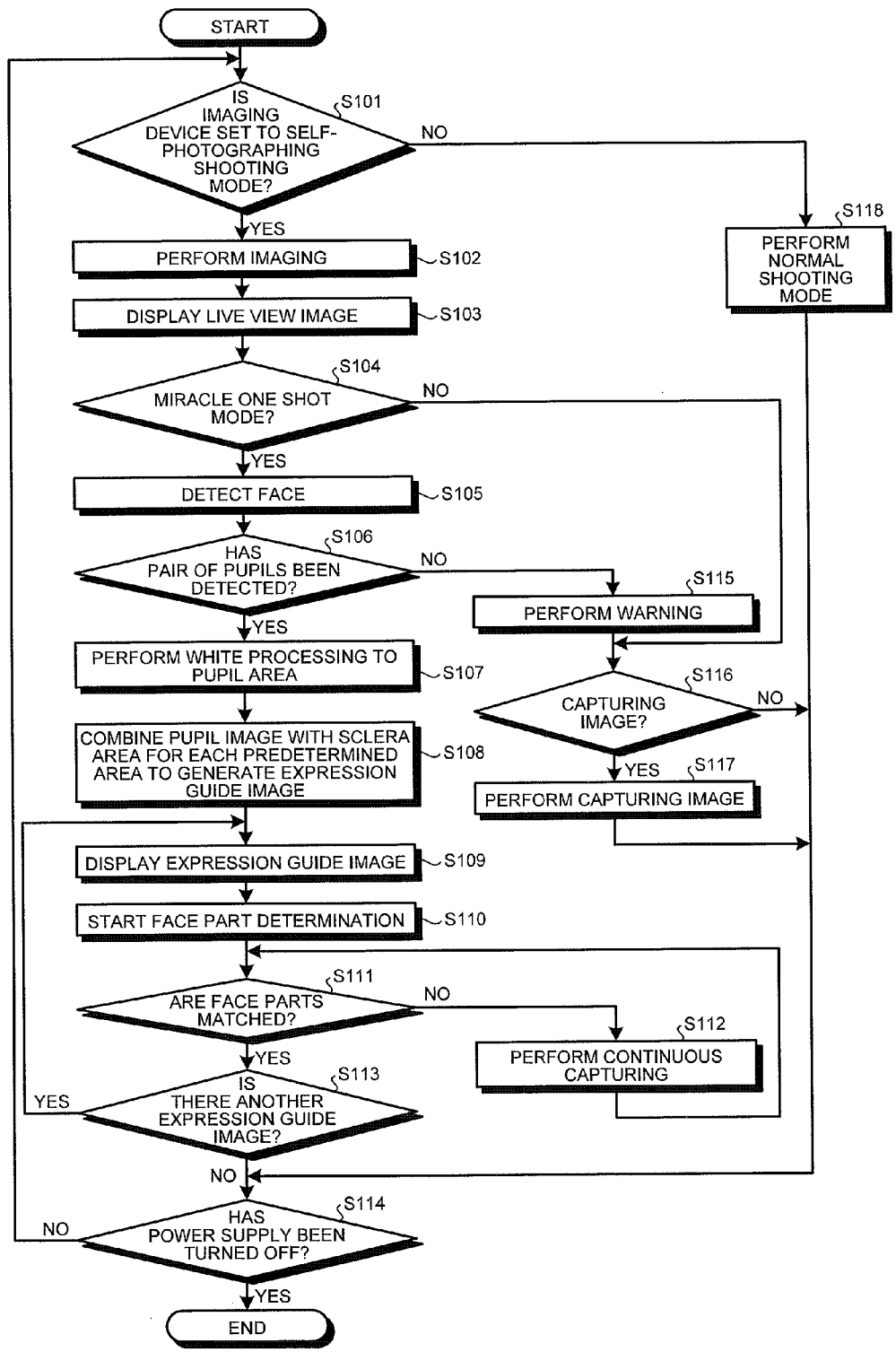
FIG. 4 is a flowchart illustrating an outline of processing executed by the imaging device according to the first embodiment of the present invention.

Processing executed by the imaging device 1 having the above configuration will be described. FIG. 4 is a flowchart describing an outline of the processing executed by the imaging device 1.

Figure 5:
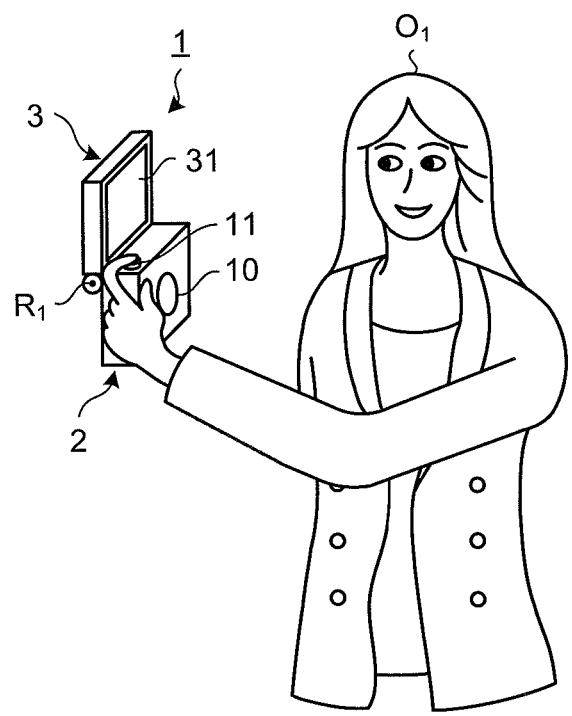
FIG. 5 is a diagram illustrating a state where the imaging device according to the first embodiment of the present invention is set to a self-photographing shooting mode.

As illustrated in FIG. 4, first, the control unit 15 determines whether the imaging device 1 is set to the self-photographing shooting mode (step S101). To be specific, the control unit 15 determines whether the display area of the display unit 31 is directed to the front surface side (the visual field area side of the imaging unit 10) of the imaging device 1 with respect to the main body 2 based on the determination result input from the revolving determination unit 14. For example, as illustrated in FIG. 5, when the display area of the display unit 31 is directed to the front surface side of the imaging device 1 by an object $O_1$ (photographer), the control unit 15 determines that the imaging device 1 is set to the self-photographing shooting mode. When the control unit 15 has determined that the imaging device 1 is set to the self-photographing shooting mode (Yes in step S101), the imaging device 1 is moved onto step S102. In contrast, when the control unit 15 has determined that the imaging device 1 is not set to a shooting mode (No in step S101), the imaging device 1 is moved onto step S118 described below.

In step S102, the imaging controller 155 causes the imaging unit 10 to execute imaging. For example, as illustrated in FIG. 5, the imaging controller 155 causes the imaging unit 10 to image the object $O_1$.

Next, the display controller 156 displays, in the display unit 31, a live view image corresponding to the image data generated by the imaging unit 10 (step S103). In this case, the display controller 156 inverts the live view image corresponding to the image data generated by the imaging unit 10 with respect to the main body 2, and displays the inverted live view image in the display unit (mirror-inverted display). Note that the display controller 156 may invert the right and left of the live view image after inverting the live view image with respect to the main body 2, and displays the inverted live view image in the display unit 31. Of course, the display controller 156 may display the live view image as it is in the display unit 31 without inverting the live view image.

Following that, when a miracle one shot mode in which an image beyond imagination of the object himself/herself can be obtained while the capturing advice related to an expression, a posture, or a composition is displayed is set to the imaging device 1 when the self-photographing capturing is performed with respect to the object $O_1$ (Yes in step S104), the face detection unit 151 detects the face of the object in the image corresponding to the image data generated by the imaging unit 10 (step S105).

Then, when the pupil detection unit 152 has detected a pair of pupils with respect to the face detected by the face detection unit 151 (Yes in step S106), the pupil-changed image generation unit 153 executes white processing of superimposing or filling white (or may be a color close to the detected white of the eyes (the sclera area), hereinafter, simplified as white and description will be given) in the pupil area (an area including pupils, irises, and corneas) of the face of the object detected by the pupil detection unit 152 and the sclera area (an area of white of the eyes) (step S107), and combines a pupil image with the sclera area for each predetermined area to generate the expression guide image in which the line of sight of the object has been changed (step S108).

Figure 6:
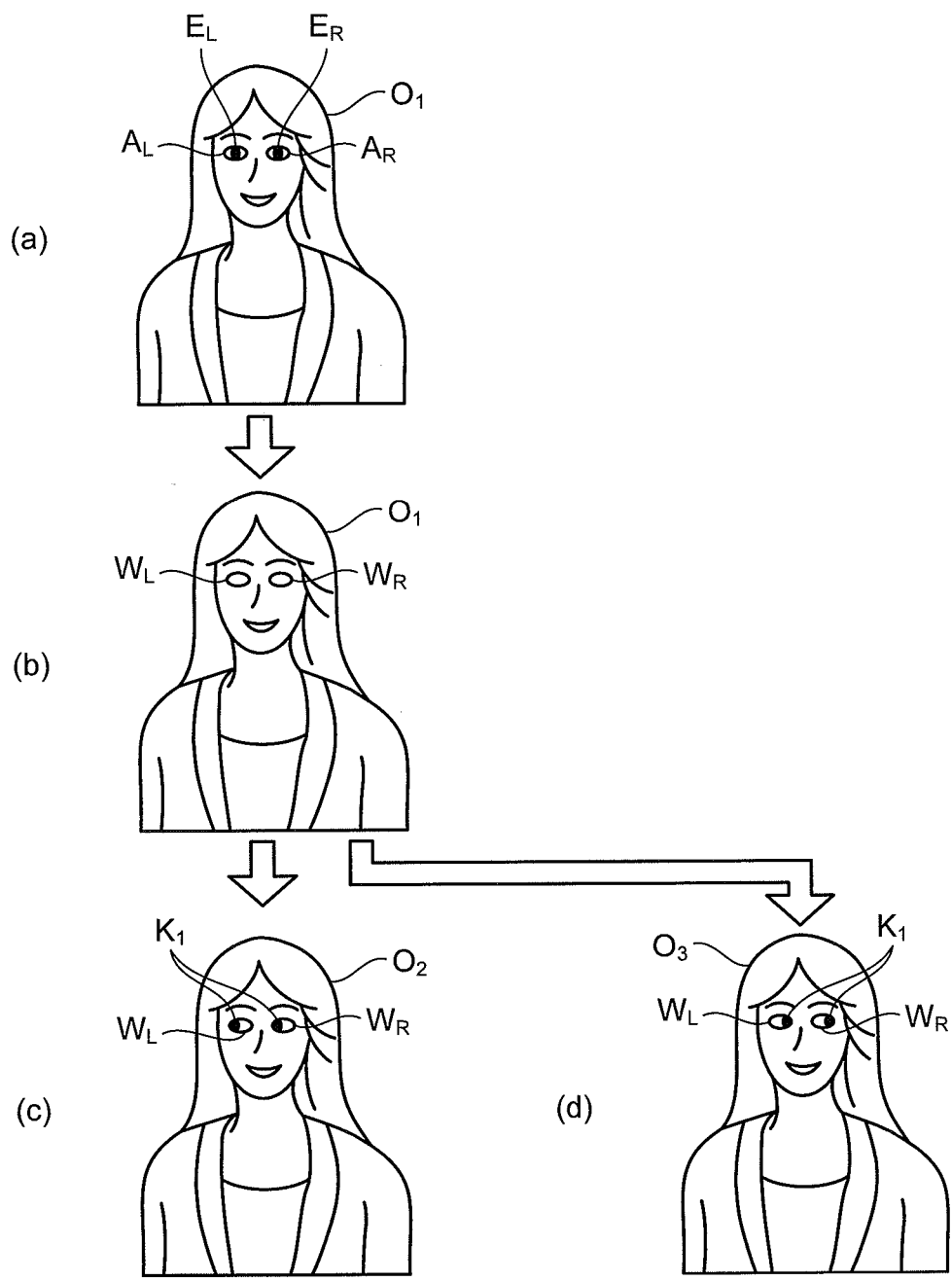
FIG. 6 is a series of diagrams schematically illustrating an outline of a method of generating an expression guide image of an object generated by a pupil-changed image generation unit of the imaging device according to the first embodiment of the present invention.

FIG. 6 is a series of diagrams schematically illustrating an outline of a method of generating the expression guide image of the object generated by the pupil-changed image generation unit 153.

As illustrated in FIG. 6(a) to (d), first, the pupil-changed image generation unit 153 executes the white processing of filling white in pupil areas ($E_L$, $E_R$) in a pair of eye areas $A_L$ and $A_R$ of the face of the object $O_1$ detected by the pupil detection unit 152 (FIG. 6(a)→FIG. 6(b)). Following that, the pupil-changed image generation unit 153 generates an expression guide image $O_2$ and an expression guide image $O_3$ of the object $O_1$ in which pupil images $K_1$ are combined with predetermined areas, such as right and left end portions (inner corners of the eyes and outer corners of the eyes) of the object $O_1$, with respect to the sclera areas $W_L$ and $W_R$ of the object $O_1$ (FIG. 6(b)→FIG. 6(c), and FIG. 6(b)→FIG. 6(d)). Note that in FIG. 6(a) to (d), the pupil-changed image generation unit 153 may generate the expression guide images having changed lines of sight of the object $O_1$ obtained such that the pupil images $K_1$ are combined with upper and lower end portions or oblique end portions, other than the right and left end portions of the eyes of the object.

Figure 7:
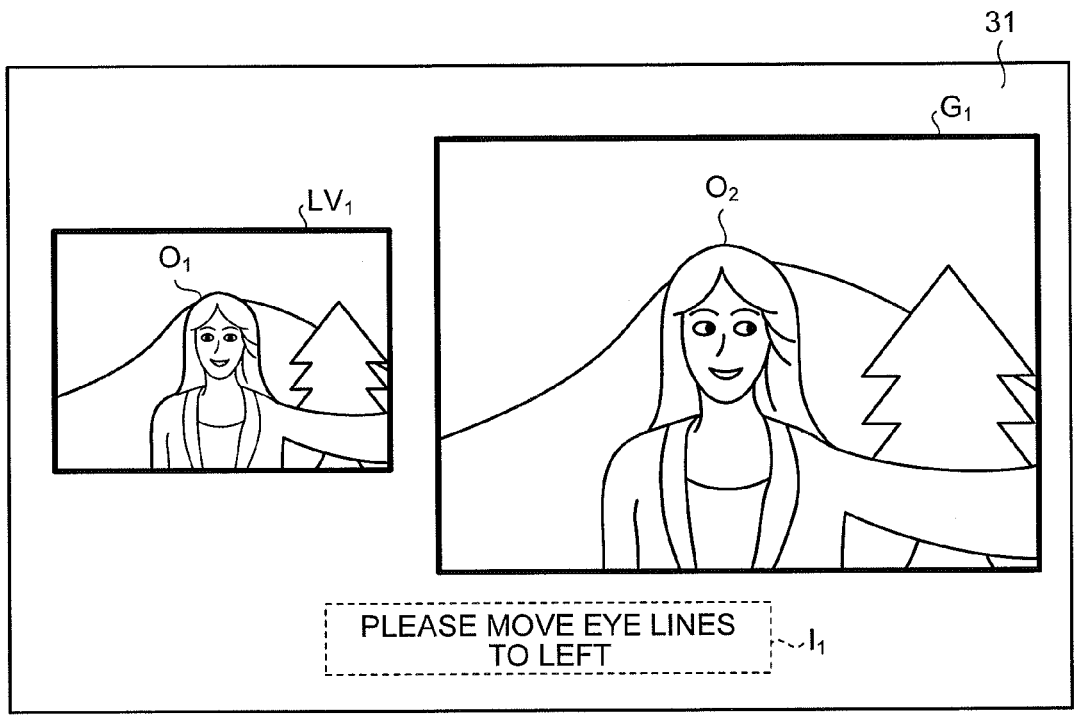
FIG. 7 is a diagram illustrating an example of an image displayed in a display unit of the imaging device according to the first embodiment of the present invention.

In step S109, the display controller 156 displays, in the display unit 31, a list of the expression guide image generated by the pupil-changed image generation unit 153 and the live view image. To be specific, as illustrated in FIG. 7, the display controller 156 displays, in the display unit 31, a live view image $LV_1$ corresponding to the image data generated by the imaging unit 10 and an expression guide image G1 generated by the pupil-changed image generation unit 153. Here, if the right and left of the imaging result is inverted and displayed like a mirror, a familiar own image can be obtained, which you usually see in the mirror. The way of moving hands, the way of turning the face, and the like can be intuitively performed with the inverted image. If giving priority to how you are looked at by others, the imaging result may not be inverted. In this case, the display controller 156 reduces the size of the live view image $LV_1$ and the expression guide image G1, and displays the reduced images in the display unit 31. Further, the display controller 156 displays the expression guide image G1 in a more enlarged manner than the live view image $LV_1$ in the display unit 31. Still further, the display controller 156 displays information for supporting the expression guide image $G_1$, for example, a message $I_1$ of "please move the eye lines to the left" in the display unit 31. Accordingly, the object $O_1$ can virtually recognize an own expression to be captured when shifting the line of sight to the display unit 31 or the imaging unit 10, by confirming the images displayed in the display unit 31 at the time of the self-photographing shooting. As a result, even if performing the self-photographing shooting, the photographer can capture a natural expression.

Further, the display controller 156 displays the list of the expression guide images G1 in the display unit 31, whereby the user (photographer) can determine which direction of the eyes is suitable for the scene of the time at first sight, and can compare and easily determine which is favorable. Apparently, the expression guide images G1 may be sequentially displayed instead of being displayed in the list. In this case, the display controller 156 does not need to divide the screen, and the user can confirm the images with a wide screen. When the user wishes to have images displayed in the list so that he/she can make a comparison, and he/she wishes to see a difference of the expressions in a large manner, there is a method of cutting only portions of the faces and arranging the portions. Such an application apparently falls within the scope covered by the present patent application. Further, it is favorable if a background can be seen so that a composition can be confirmed at the same time.

Therefore, the imaging device 1 may perform expression simulation after confirming a composition. Apparently, a best image of the direction of the eye lines may sometimes be able to be selected in view of the background and the expression. In this case, the display controller 156 may have a specification of displaying a single recommended image (an advice image) that prompts the user to capture an image with the recommended image, without displaying a plurality of images in the display unit 31. The display controller 156 may not only automatically change the direction of the eye lines, but also move the eye lines (black of the eyes) to look at the direction when a touch panel is slid, or when a specific switch is operated. Imaging devices of the past cameras only can confirm images staring at the display unit 31. Therefore, an expression that does not stare at the display unit 31 being able to be changed and confirmed depending on operations of the photographer enables unprecedented "self-photographing shooting", and exhibits a remarkable effect in capturing an image. That is, the image staring at the display unit 31 is converted into an image having another eye line, which leads to finding of an attractive expression that has not been noticed before.

After step S109, the expression determination unit 154 starts face part determination of determining whether a face part of the object $O_1$ in the expression guide image $G_1$ generated by the pupil-changed image generation unit 153 and a face part of the object $O_1$ in the image corresponding to the image data generated by the imaging unit 10 are matched (step S110).

When the expression determination unit 154 has determined that the face part of the object $O_1$ in the expression guide image $G_1$ and the face part of the object $O_1$ in the image corresponding to the image data generated by the imaging unit 10, for example, the lines of sight of the eyes are matched (Yes in step S111), the imaging device 1 is moved onto step S113 described below. In contrast, when the expression determination unit 154 has determined that the face part of the object $O_1$ in the expression guide image $G_1$ and the face part of the object $O_1$ in the image corresponding to the image data generated by the imaging unit 10 are not matched (No in step S111), the imaging device 1 is moved onto step S112 described below. At this time, it is not necessary to determine full matching, and thus similarity may just be determined. The similarity may be determined such that relative positions, angles, shapes, or the like of respective parts are converted into numerical values and the degree of matching is checked, and if the degree of matching is high.

In step S112, the imaging controller 155 causes the imaging unit 10 to continuously capture the object $O_1$ (continuous capturing). At this time, the imaging controller 155 may perform correction of raising an exposure value of the images corresponding to image data continuously generated by the imaging unit 10. Further, the imaging controller 155 may continuously follow movement of the object $O_1$ while focusing a pint position of the imaging unit 10 on a pupil or an eyebrow of the object $O_1$, and continuously capture the object $O_1$. In this case, the imaging controller 155 may sequentially record the image data continuously generated by the imaging unit 10 in the recording medium 13 in time series, or may record the image data in the recording medium 13 while thinning out predetermined frames. Accordingly, an image captured with a natural expression that cannot be created by the object $O_1$ can be obtained. Further, the imaging controller 155 may change the frame rate of the imaging unit 10 from 30 fps to high-speed 60 fps. Still further, the imaging controller 155 may reduce the data size of the image data generated by the imaging unit 10, and continuously capture the object. After step S112, the imaging device 1 is returned to step S111.

In step S113, when there is another expression guide image (Yes in step S113), the imaging device 1 is returned to step S109. In contrast, when there is not another expression guide image (No in step S113), the imaging device 1 is moved onto step S114.

In step S114, when the power supply of the imaging device 1 has been turned OFF (Yes in step S114), the imaging device 1 terminates the present processing. In contrast, when the power supply of the imaging device 1 has not been turned OFF (No in step S114), the imaging device 1 is returned to step S101.

In step S106, when the pupil detection unit 152 has not detected a pair of pupils with respect to the face detected by the face detection unit 151 (No in step S106), the display controller 156 superimposes warning on the live view image and displays the superimposed image in the display unit 31 (step S115).

Following that, when a release signal that instructs capturing an image has been input from the input unit 11 (Yes in step S116), the imaging device 1 executes capturing an image (step S117). After step S117, the imaging device 1 is moved onto step S114. In contrast, when the release signal that instructs capturing an image has not been input from the input unit 11 (No in step S116), the imaging device 1 is moved onto step S114.

In step S104, when the miracle one shot mode is not set to the imaging device 1 (No in step S104), the imaging device 1 is moved onto step S116.

In step S118, when the display unit 31 is displaying the live view image corresponding to the image data generated by the imaging unit 10, and the release signal that instructs capturing an image has been input from the input unit 11, the imaging device 1 executes normal shooting mode processing of capturing the object. After step S118, the imaging device 1 is moved onto step S114.

According to the first embodiment of the present invention, a natural expression unconsciously given by the object can be captured.

Further, according to the first embodiment of the present invention, when the expression determination unit 154 has determined that the expression of the object in the image corresponding to the image data generated by the imaging unit 10 and the expression of the object in the expression guide image are not matched, the imaging controller 155 causes the imaging unit 10 to continuously image the object. Therefore, the photographer can capture the object having an expression that is more than the photographer imagined.

Further, according to the first embodiment of the present invention, when the expression determination unit 154 has determined that the expression of the object in the image corresponding to the image data generated by the imaging unit 10 and the expression of the objet in the expression guide image are matched, the display controller 156 displays another expression guide image in the display unit 31. Therefore, the photographer can more continuously capture the object having an expression that is more than the photographer imagined.

Note that, in the first embodiment of the present invention, a case in which the imaging device 1 is set to the self-photographing shooting mode has been described. However, for example, the imaging device 1 can be applied to a normal shooting mode. In this case, the photographer can capture the object having an expression that is not intended by the photographer by giving advice to the object along a plurality of expression guide images displayed in the display unit 31.

Further, while, in the first embodiment of the present invention, the description has been given using a single person, if this technology is applied to two persons, the imaging device 1 that prompts shooting of a drama produced with crossing of eye lines of the two persons can be obtained. Further, a guide device that prompts the two persons to look at each other, apart from the imaging device 1, can be provided.

Further, in the first embodiment of the present invention, the display controller 156 displays the guide image in which the line of sight of the object has been changed, in the display unit 31. However, for example, an avatar, an animation, or the like recorded in the imaging device 1 in advance may be displayed in the display unit 31.

Second Embodiment

Next, a second embodiment of the present invention will be described. An imaging device according to the second embodiment is different from the imaging device 1 according to the first embodiment, and processing to be executed is different. To be specific, while the imaging device 1 according to the first embodiment changes the positions of the pupils of the object, an imaging device according to the second embodiment changes positions of parts that configure a face of an object. Therefore, hereinafter, a configuration of the imaging device according to the second embodiment will be described first, and then processing executed by the imaging device according to the second embodiment will be described. Note that the same configurations as the imaging device 1 according to the first embodiment are denoted with the same reference signs, and description is omitted.

Figure 8:
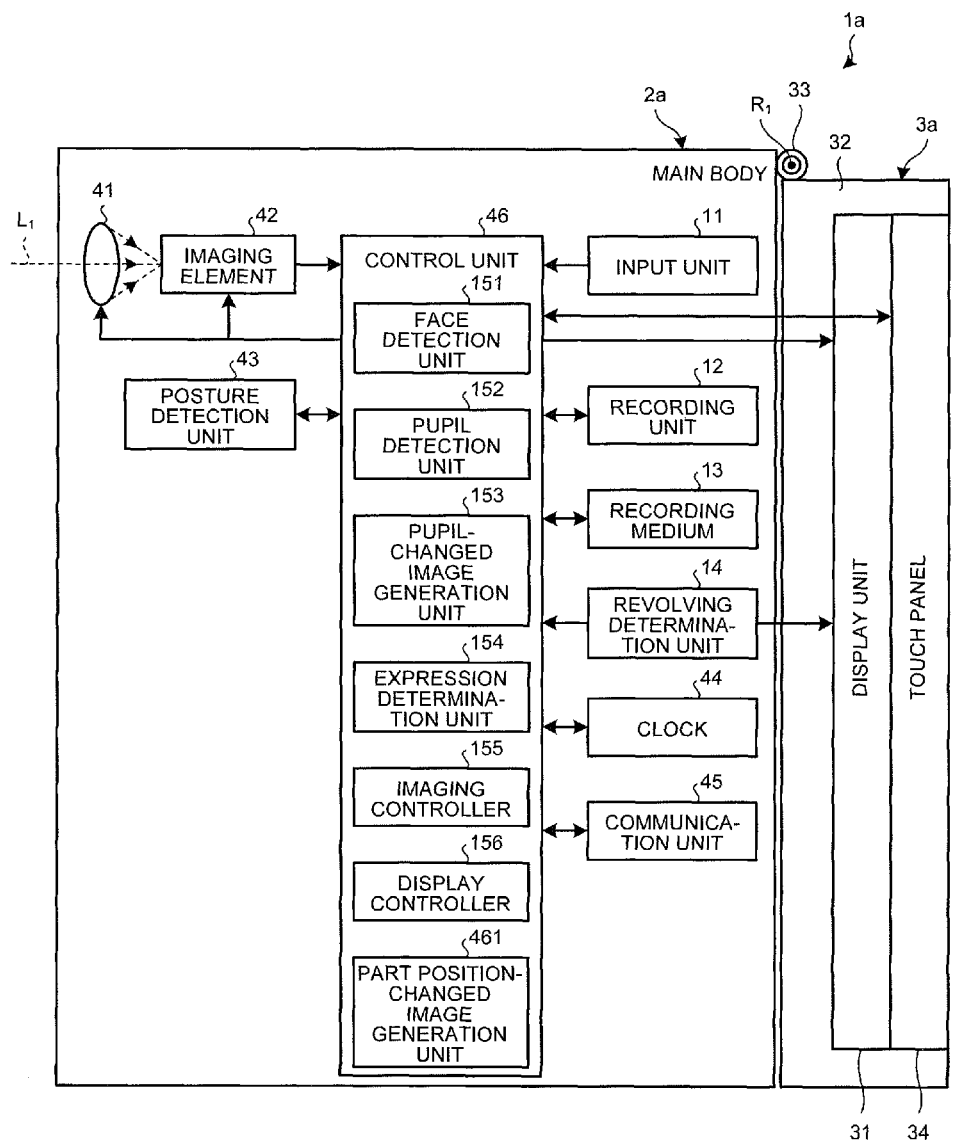
FIG. 8 is a block diagram illustrating a functional configuration of an imaging device according to a second embodiment of the present invention.

FIG. 8 is a block diagram illustrating a functional configuration of the imaging device according to the second embodiment. An imaging device 1a illustrated in FIG. 8 includes a main body 2a that images an object and generates image data of the object, and a display mechanism 3a rotatably provided to the main body 2a from a back surface side to a front surface side, and capable of displaying an image corresponding to the image data generated by the main body 2a.

First, a configuration of the main body 2a will be described. The main body 2a includes an input unit 11, a recording unit 12, a recording medium 13, a revolving determination unit 14, a lens unit 41, an imaging element 42, a posture detection unit 43, a clock 44, a communication unit 45, and a control unit 46.

The lens unit 41 collects light from a predetermined visual field area and focuses an object image on an imaging plane of the imaging element 42 under control of the control unit 46. The lens unit 41 is configured from a zoom lens and a focus lens movable along an optical axis $L_1$, a diaphragm, a shutter, and the like.

The imaging element 42 receives the object image focused by the lens unit 41 and performs photoelectric conversion to generate image data under control of the control unit 46. The imaging element 42 is configured from a CCD or a CMOS, a signal processing unit, an A/D converter, and the like. The imaging element 42 images the object at a predetermined frame rate under control of the control unit 46. Note that, in the second embodiment, the lens unit 41 and the imaging element 42 function as an imaging unit.

The posture detection unit 43 is configured from an acceleration sensor and a gyro sensor, and detects acceleration and an angular speed caused in the imaging device 1a, and outputs detection results to the control unit 46.

The clock 44 has a timing function and a determination function of capturing date and time. The clock 44 outputs date and time data to the control unit 46 to add the date and time data to the image data imaged by the imaging element 42.

The communication unit 45 performs wireless communication with an external device and transmits/receives an image file including the image data according to predetermined wireless communication standards. Here, the predetermined wireless communication standards are IEEE802.11b, IEEE802.11n, and the like. Note that, in the second embodiment, any wireless communication standard is applicable. Further, the communication unit 45 is configured from a communication device for bidirectionally performing communication of various types of information such as the image file and content data with an external device through a network. The communication device is configured from an antenna that transmits/receives radio wave signals to/from the external device, a transmission/reception circuit that performs demodulation processing of a signal received by the antenna and performs modulation processing of a signal to be transmitted, and the like. Further, the communication unit 45 periodically transmits a communication signal including identification information (a device ID) that notifies its existence at the time of startup of the imaging device 1a. Note that the communication unit 45 may be provided in a recording medium such as a memory card mounted from an outside of the imaging device 1a. Further, the communication unit 45 may be provided in an accessory attached to the imaging device 1a through a hot shoe.

The control unit 46 transfers instructions and data corresponding to respective units that configure the imaging device 1a to comprehensively control an operation of the imaging device 1a. The control unit 46 is configured from a CPU, and the like.

Here, a detailed configuration of the control unit 46 will be described. The control unit 46 includes a face detection unit 151, a pupil detection unit 152, a pupil-changed image generation unit 153, an expression determination unit 154, an imaging controller 155, a display controller 156, and a part position-changed image generation unit 461.

The part position-changed image generation unit 461 generates part-changed image data of an object in which parts that configure a face detected by the face detection unit 151 have been moved into an arranging direction of a pupil area in a sclera area changed by the pupil-changed image generation unit 153.

Next, a configuration of the display mechanism 3a will be described. The display mechanism 3a includes a display unit 31, a movable unit 32, a revolving support unit 33, and a touch panel 34.

The touch panel 34 is provided by being superimposed on a display screen of the display unit 31. The touch panel 34 detects touching of a substance from an outside, and outputs a position signal according to a detected touched position to the control unit 46. Further, the touch panel 34 detects a position touched by a user based on information displayed in the display unit 31, for example, an icon image or a thumbnail image, and receives an input of an instruction signal that instructs an operation to be performed by the imaging device 1a according to the detected touched position. Typically, as the touch panel 34, there are a resistive film-type touch panel, an electrostatic capacity type touch panel, an optical type touch panel, and the like. In the second embodiment, any type touch panel is applicable. Further, the display unit 31, the movable unit 32, and the touch panel 34 may be integrally formed.

Figure 9:
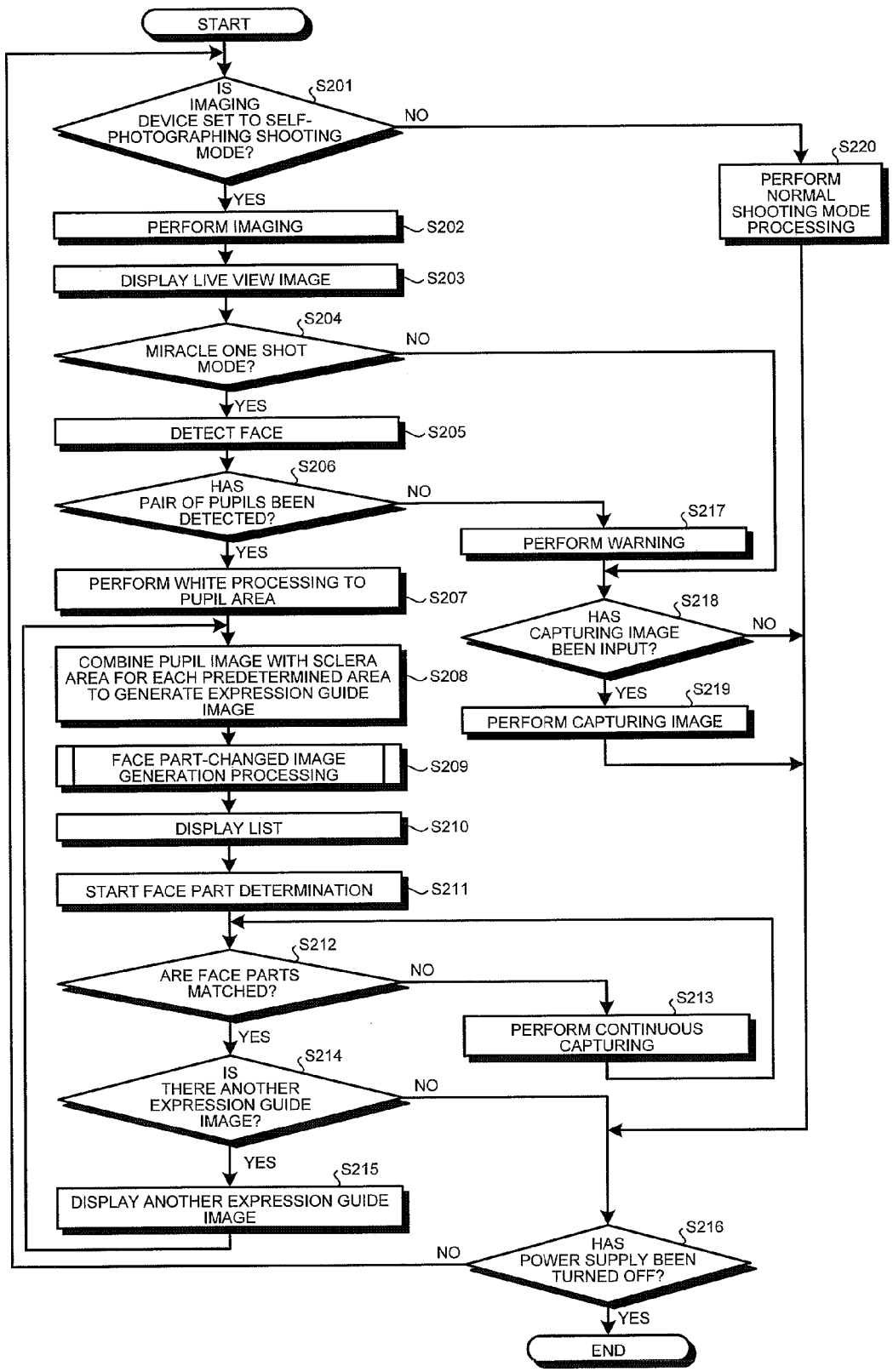
FIG. 9 is a flowchart illustrating an outline of processing executed by the imaging device according to the second embodiment of the present invention.

Processing executed by the imaging device 1a having the above configuration will be described. FIG. 9 is a flowchart illustrating an outline of the processing executed by the imaging device 1a.

Steps S201 to S208 respectively correspond to steps S101 to S108 of FIG. 4 described above.

In step S209, the part position-changed image generation unit 461 executes face part changed-image generation processing of generating a plurality of expression guide images in which parts (characteristic points) of the face of the object have been changed (step S209).

Figure 10:
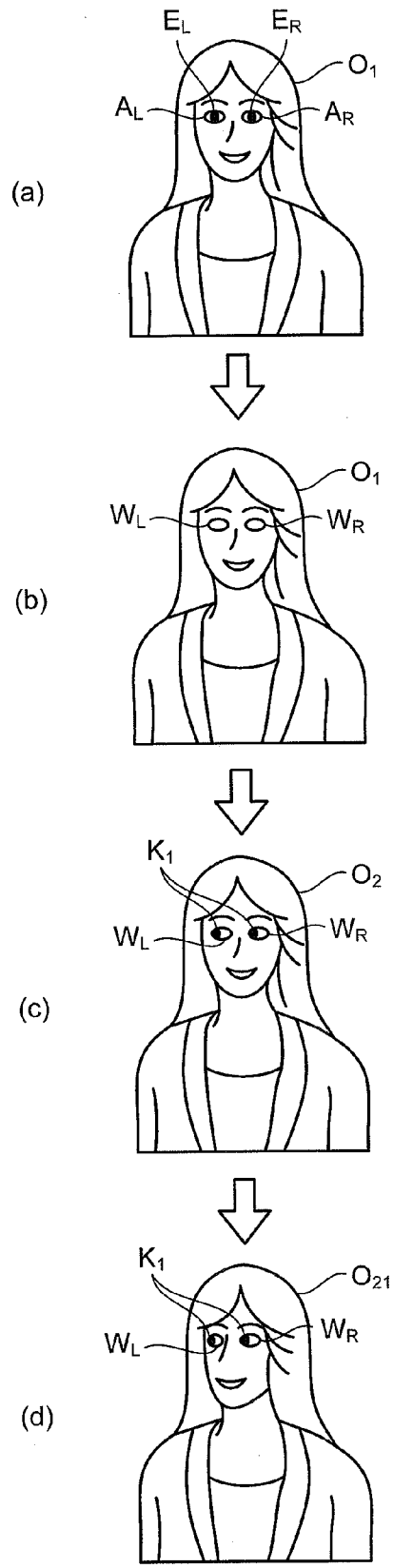
FIG. 10 is a series of diagrams schematically describing an outline of a method of generating an expression guide image generated by a part position-changed image generation unit of the imaging device according to the second embodiment of the present invention.

FIG. 10 is a series of diagrams schematically describing an outline of a method of generating the expression guide image generated by the part position-changed image generation unit 461. As illustrated in FIG. 10(a) to (d), the part position-changed image generation unit 461 changes positions of parts of a face (FIG. 10(d)) with respect to an image of an object $O_1$ in which positions of pupils have been changed by the pupil-changed image generation unit 153 (FIG. 10(a)→FIG. 10(b)→FIG. 10(c)), based on a direction into which the pupils are directed. To be specific, as illustrated in FIG. 10(d), when the pupils of the object $O_1$ are directed to the left (see FIG. 10(c)), the part position-changed image generation unit 461 generates a similar expression guide image $O_{21}$ in which positions of a mouth and a chin that are the parts of the face have been moved in the left direction (FIG. 10(d)).

Figure 11:
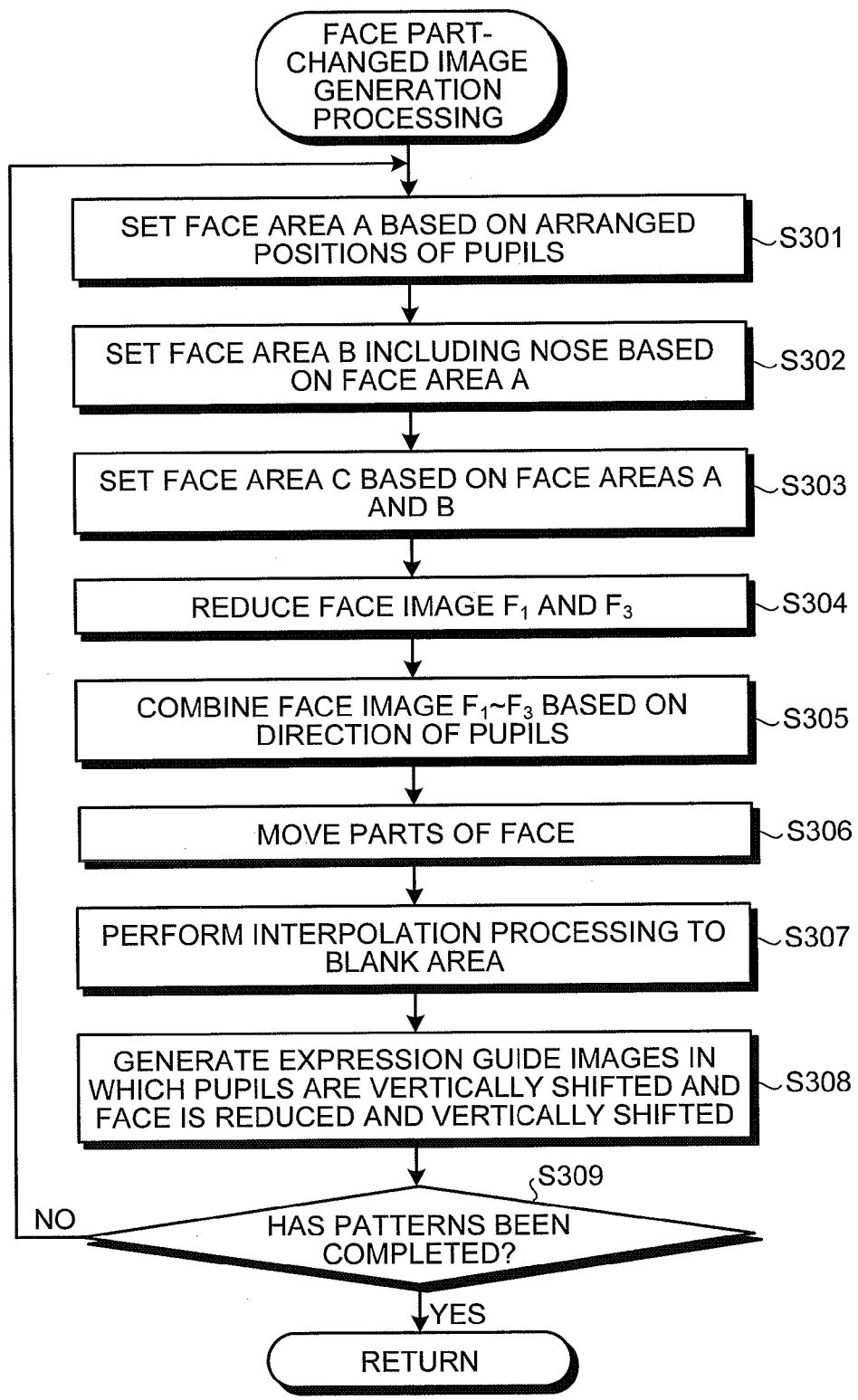
FIG. 11 is a flowchart illustrating an outline of face part changed-image generation processing of FIG. 9.
Figure 12:
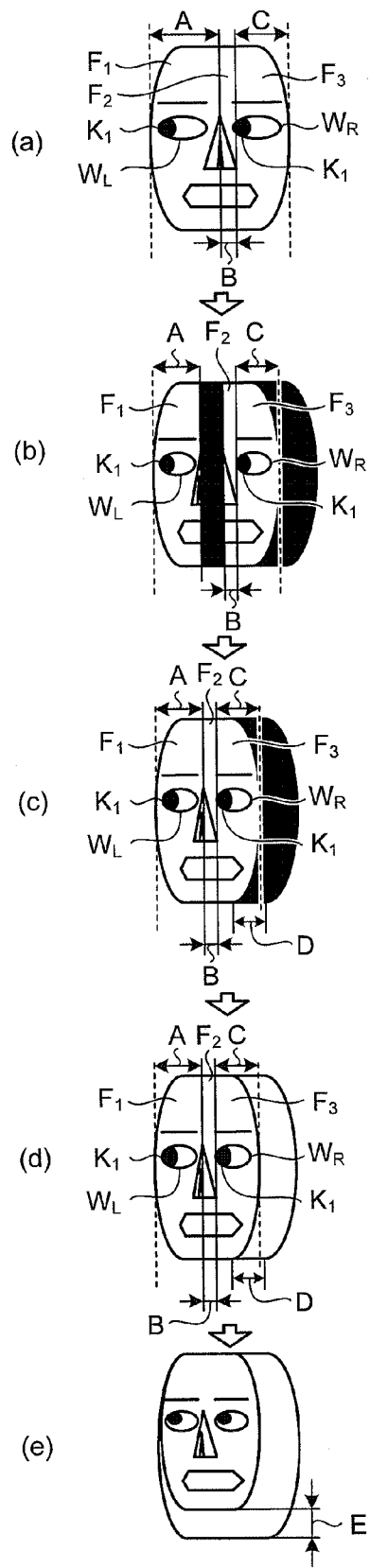
FIG. 12 is a series of diagrams describing the method of generating an expression guide image generated by the part position-changed image generation unit of the imaging device according to the second embodiment of the present invention.

Here, the face part changed-image generation processing of step S209 of FIG. 9 will be described in detail. FIG. 11 is a flowchart illustrating an outline of the face part changed-image generation processing. FIG. 12 is a series of diagrams describing a method of generating the expression guide image generated by the part position-changed image generation unit 461.

As illustrated in FIG. 11, first, the part position-changed image generation unit 461 sets a face area A based on arranged positions of the pupils of the object changed by the pupil-changed image generation unit 153 (step S301).

Following that, the part position-changed image generation unit 461 sets a face area B including a nose of the object based on the face area A (step S302), and sets a face area C based on the face areas A and B (step S303). To be specific, as illustrated in FIG. 12(a), the part position-changed image generation unit 461 sets the face areas A, B, and C to the area of the face of the object.

Following that, the part position-changed image generation unit 461 reduces a face image in the face area A and a face image in the face area C into a direction of the arranged positions of the pupils of the object changed by the pupil-changed image generation unit 153 (step S304). To be specific, as illustrated in FIG. 12(b), the part position-changed image generation unit 461 reduces a face image $F_1$ in the face area A and a face image $F_3$ in the face area C into a direction of arranged positions of pupil images $K_1$ of the object changed by the pupil-changed image generation unit 153, for example, the left direction.

Following that the part position-changed image generation unit 461 moves and combines the face image $F_1$, a face image $F_2$, and the face image $F_3$ into the direction of the arranged positions of the pupil images $K_1$ of the object changed by the pupil-changed image generation unit 153 (step S305). To be specific, as illustrated in FIG. 12(c), the part position-changed image generation unit 461 moves and combines the face images $F_1$, $F_2$, and $F_3$ into the direction (left side) of the arranged positions of the pupil images $K_1$ of the object changed by the pupil-changed image generation unit 153 (FIG. 12(b)→FIG. 12(c)).

Following that, the part position-changed image generation unit 461 moves the parts of the face of the object into the direction of the arranged position of the pupil image of the object changed by the pupil-changed image generation unit 153 (step S306).

Figure 13:
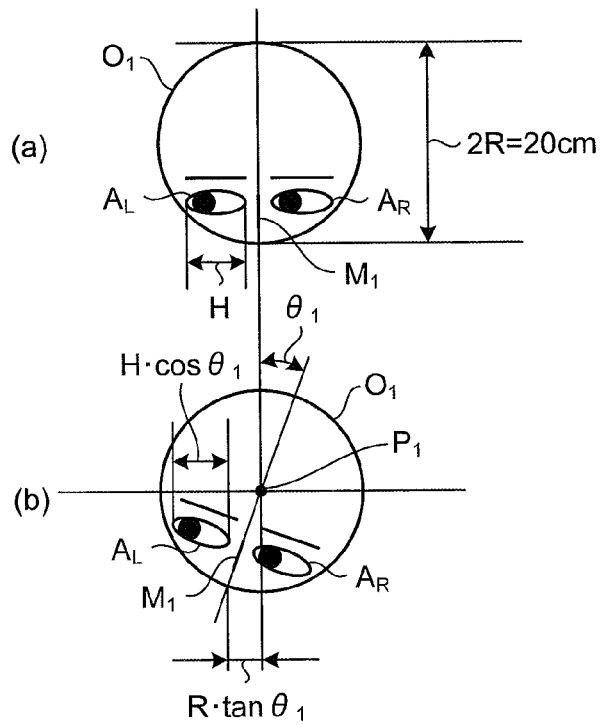
FIG. 13 is a series of diagrams schematically describing an outline of a method of moving parts of a face of an object by the part position-changed image generation unit of the imaging device according to the second embodiment of the present invention.

FIG. 13 is a series of diagrams schematically describing an outline of a method of moving the parts of the face of the object by the part position-changed image generation unit 461.

As illustrated in FIG. 13(a), when a neck is turned by a predetermined angle $\theta_1$ from a state where the object $O_1$ faces the front where a head portion of the object $O_1$ is a sphere having a radius R (for example, R=10 cm), a position of a nose $M_1$ can be expressed by R·tan $\theta_1$. Further, a length of each part of the face in the lateral direction can also be expressed based on the angle $\theta_1$. To be specific, the length of each part can be expressed by H·cos $\theta_1$ where widths of eye areas $A_L$ and $A_R$ of the object $O_1$ are H. Therefore, the part position-changed image generation unit 461 multiplies each principal part of the face by cos $\theta_1$, and then moves the principal part from a center $P_1$ of the object $O_1$ by R·tan $\theta_1$, thereby to generate an image in which the object $O_1$ faces sideways.

Figure 14:
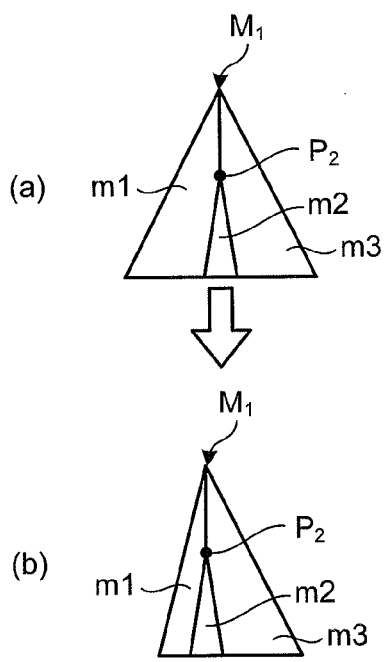
FIG. 14 is a series of diagrams schematically describing an outline of a method of moving a nose of the object by the part-position-changed image generation unit of the imaging device according to the second embodiment of the present invention.

By the way, as illustrated in FIG. 14(a), the area of the nose $M_1$ of the object has a large stereoscopic effect, and an area $m_1$ of a ridgeline (shading) of the nose $M_1$ in an inclined direction becomes difficult to be seen, and thus it is necessary to make an area $m_3$ of a side surface at an opposite side to the inclined direction be displayed in a large manner, rather than to multiply the part by cos $\theta_1$ times. Therefore, as illustrated in FIG. 14(b), the part position-changed image generation unit 461 divides a portion of the nose $M_1$ at a top $P_2$ of a protrusion, and reduces the size of only the area $m_1$ that is an inclined area. Accordingly, the part position-changed image generation unit 461 can generate a natural expression guide image in which the object looks sideways. Here, an example has been described. However, a method of calling a database of images classified into face directions with part position information, and attaching an actually captured image to a called image can also be considered.

In step S307, the part position-changed image generation unit 461 executes interpolation processing of interpolating pixels in a blank area based on information of surrounding pixels. To be specific, as illustrated in FIG. 12(d), the part position-changed image generation unit 461 performs the interpolation processing of interpolating other pixels in a blank area D (FIG. 12(c)). Note that, in FIG. 12, a state in which the object $O_1$ does not wear an accessory such as a pair of glasses has been described. However, even if the object $O_1$ wears an accessory, the present invention can be applied. In this case, the part position-changed image generation unit 461 similarly generates an accessory image of when the object $O_1$ looks sideways by multiplying the accessory, for example, a pair of glasses by cos $\theta_1$ times, and then moving the accessory from the center $P_1$ of the object $O_1$ by R·tan $\theta_1$, and superimposes the accessory image on the expression guide image. At this time, when pixels are not sufficient in the area of the accessory, the part position-changed image generation unit 461 may just interpolate the pixels of a color of a largest ratio in another area or in the area of the accessory.

Following that, the part position-changed image generation unit 461 vertically shifts the pupils, and reduces the size of the face, and generates vertically-shifted expression guide images (step S308). For example, as illustrated in FIG. 12(e), the part position-changed image generation unit 461 shifts the pupil image upward in a sclera area $W_L$, and generates an expression guide image in which the face is reduced in the arranging direction of the pupil image by a distance E. Similarly, the part position-changed image generation unit 461 shifts the pupil image downward in the sclera area $W_L$, and generates an expression guide image in which the face is reduced in the arranging direction of the pupil image.

Following that, when the generation of the expression guide images of respective patterns by the part position-changed image generation unit 461 has been completed (Yes in step S309), the imaging device 1a is returned to the main routine of FIG. 9. In contrast, when the generation of the expression guide images of respective patterns by the part position-changed image generation unit 461 has not been completed (No in step S309), the imaging device 1a is returned to step S301.

Figure 15:
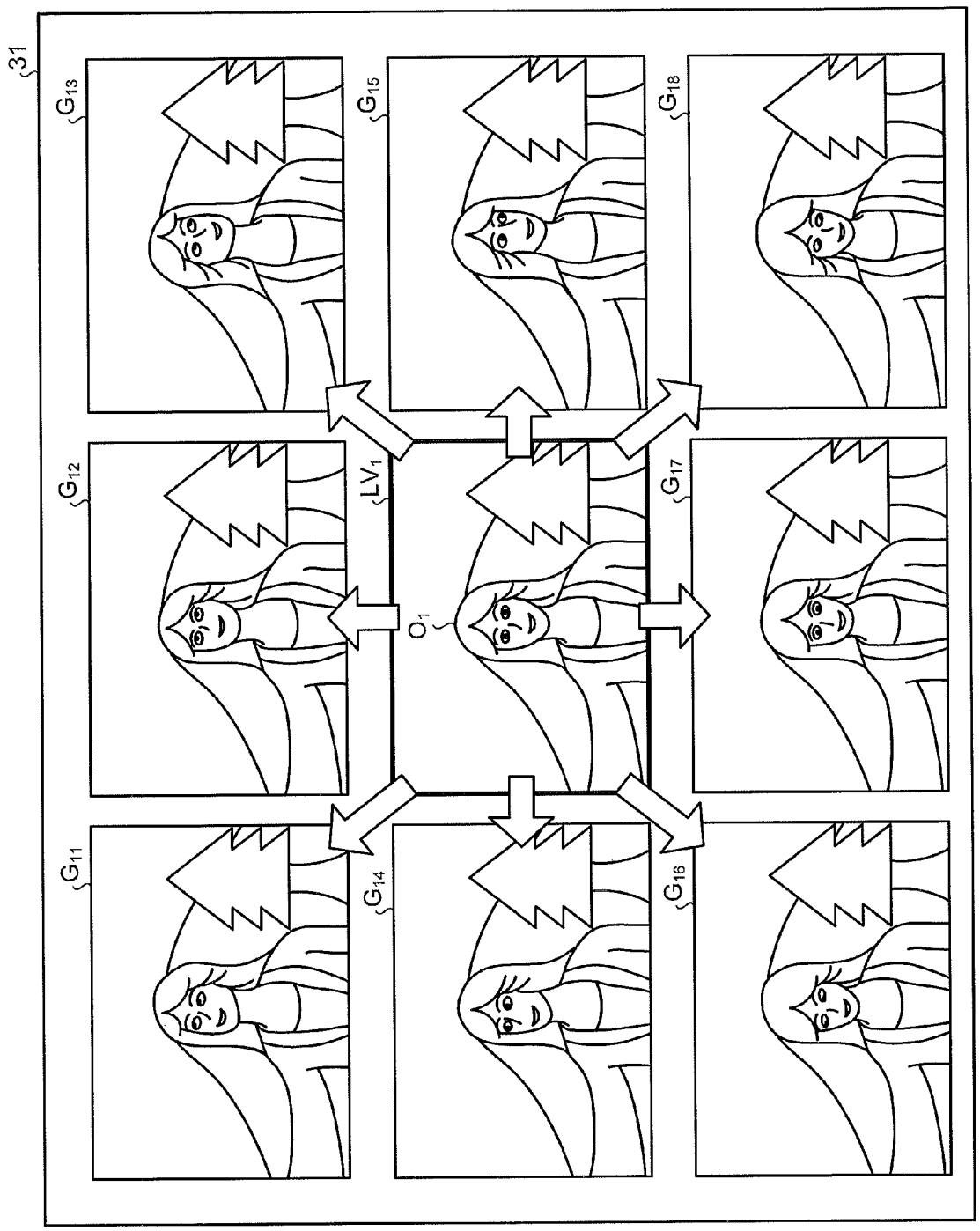
FIG. 15 is a diagram illustrating an example of images displayed in a display unit of the imaging device according to the second embodiment of the present invention.

Referring back to FIG. 9, description of step S210 and subsequent steps will be described. In step S210, the display controller 156 displays, in the display unit 31, a list of a plurality of expression guide images generated by the part position-changed image generation unit 461, in which the positions and the parts of the face of the object have been changed. To be specific, as illustrated in FIG. 15, the display controller 156 displays, in the display unit 31, a list of a plurality of expression guide images $G_{11}$ to $G_{18}$ having changed positions of the face of the object generated by the part position-changed image generation unit 461 and the live view image $LV_1$. Accordingly, the object $O_1$ (photographer) can virtually recognize an own expression beyond expectation by confirming the images displayed in the display unit 31 at the time of the self-photographing shooting. Further, the plurality of expression guide images $G_{11}$ to $G_{18}$ is displayed in the list in the display unit 31, whereby the object $O_1$ can confirm how many poses of capturing an image exist in advance, and thus the object $O_1$ can be ready for the capturing an image.

Steps S211 to S214 and S216 to S220 respectively correspond to steps S110 to S118 of FIG. 4 described above, and step S215 corresponds to step S109 of FIG. 4 described above.

According to the second embodiment of the present invention, the object having a natural posture or expression can be unconsciously captured.

Further, according to the second embodiment of the present invention, when the expression determination unit 154 has determined that the expression of the object in the image corresponding to the image data generated by the imaging element 42 and the expression of the object in the expression guide image are not matched, the imaging controller 155 causes the imaging element 42 to continuously image the object, and thus the photographer can capture the object having an expression more than he/she imagined.

Further, according to the second embodiment of the present invention, when the expression determination unit 154 has determined that the expression of the object in the image corresponding to the image data generated by the imaging element 42 and the expression of the object in the expression guide image are matched, the display controller 156 displays another expression guide image in the display unit 31. Therefore, the photographer can more continuously capture the object having an expression more than he/she imagined.

Figure 16:
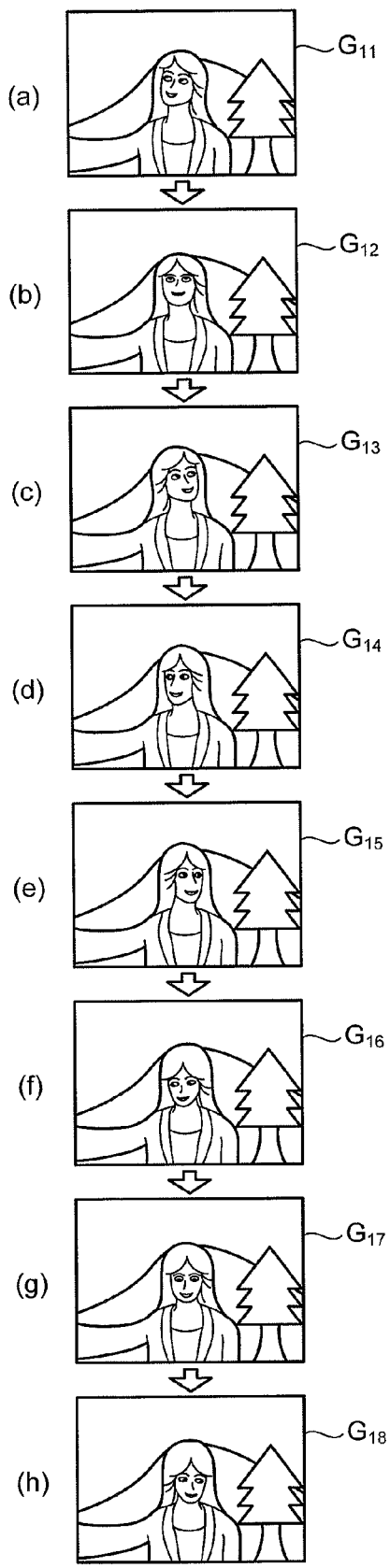
FIG. 16 is a series of transition diagrams of another image displayed in the display unit of the imaging device according to the second embodiment of the present invention.

Note that, in the second embodiment of the present invention, the display controller 156 displays the list of the plurality of expression guide images in the display unit 31. However, for example, as illustrated in FIG. 16, the display unit 31 may sequentially display the plurality of expression guide images in the display unit 31 (FIG. 16(a)→FIG. 16(b)→FIG. 16(c)→FIG. 16(d)→FIG. 16 (e)→FIG. 16 (f)→FIG. 16 (g)→FIG. 16 (h)). Accordingly, the photographer can change the posture at the time of capturing an image while confirming the expression guide images $G_{11}$ to $G_{18}$ displayed in the display unit 31.

Third Embodiment

Next, a third embodiment of the present invention will be described. An imaging device according to the third embodiment has a configuration different from the imaging device 1a according to the second embodiment, and processing to be executed is different. To be specific, while the imaging device 1a according to the second embodiment performs continuous capturing according to the expression guide image generated by the part position-changed image generation unit 461, an imaging device according to the third embodiment performs continuous capturing according to an expression guide image recorded in advance obtained such that a model of a predetermined posture and/or expression is captured as an object, and representatively records or displays an image that matches a characteristic of the expression guide image, from among a plurality of images. Therefore, hereinafter, a configuration of the imaging device according to the third embodiment will be described first, and then processing executed by the imaging device according to the third embodiment will be described. Note that the same configurations as the imaging device 1a of the second embodiment are denoted with the same reference signs, and description is omitted.

Figure 17:
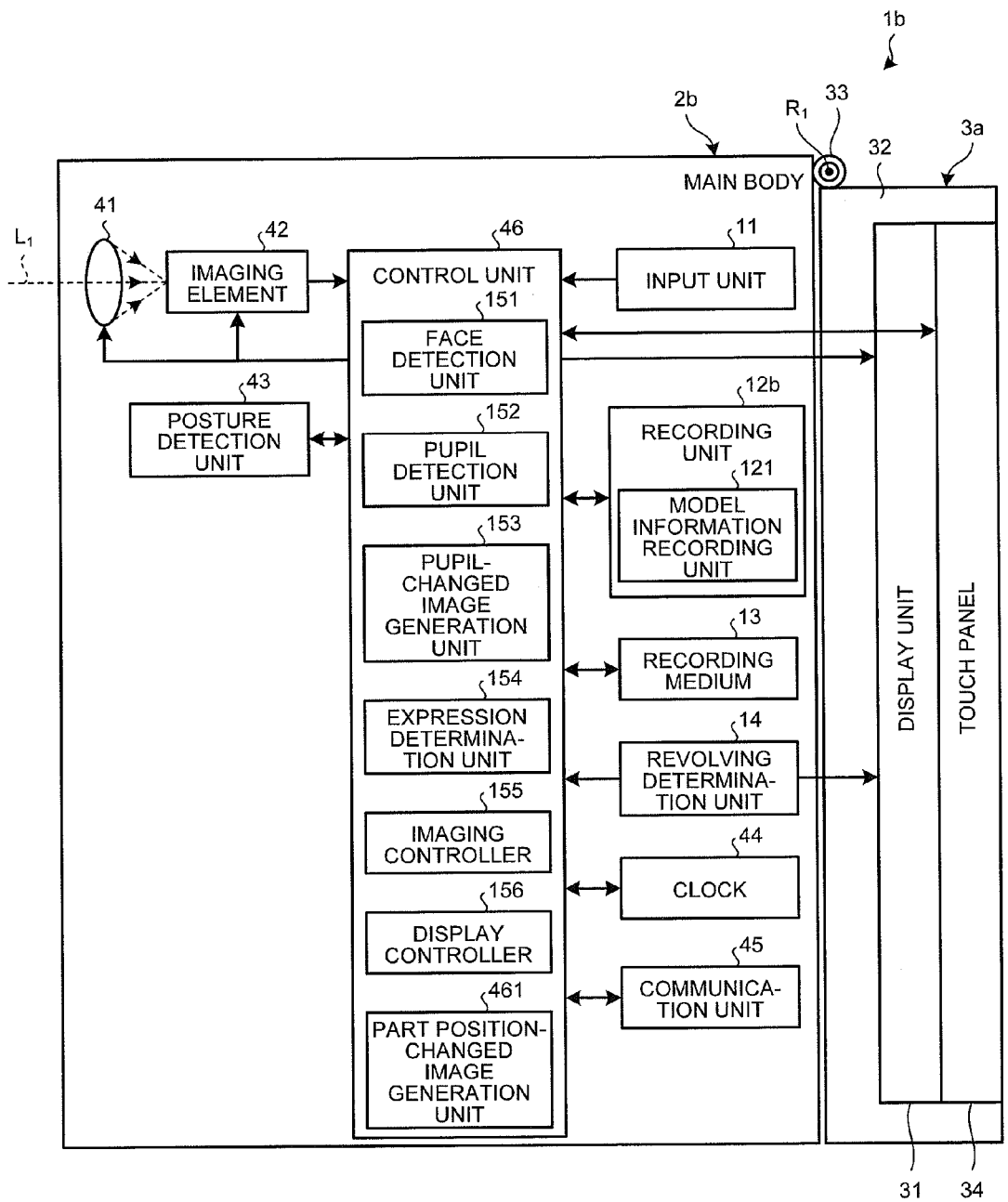
FIG. 17 is a block diagram illustrating a functional configuration of an imaging device according to a third embodiment of the present invention.

FIG. 17 is a block diagram illustrating a functional configuration of an imaging device according to the third embodiment. An imaging device 1b illustrated in FIG. 17 includes a main body 2b that images an object and generates image data of the object, and a display mechanism 3a.

The main body 2b includes an input unit 11, a recording medium 13, a revolving determination unit 14, a lens unit 41, an imaging element 42, a posture detection unit 43, a clock 44, a communication unit 45, a control unit 46, and a recording unit 12b.

The recording unit 12b records image data input through the control unit 46, information in processing by the imaging device 1b, various programs for operating the imaging device 1b, a program according to the third embodiment, and various data used during execution of the program. The recording unit 12b is configured from an SDRAM, a flash memory, and the like. Further, the recording unit 12b includes a model information recording unit 121.

The model information recording unit 121 records sample image data obtained such that a model of a predetermined posture and/or expression is captured in advance as a sample.

Figure 18:
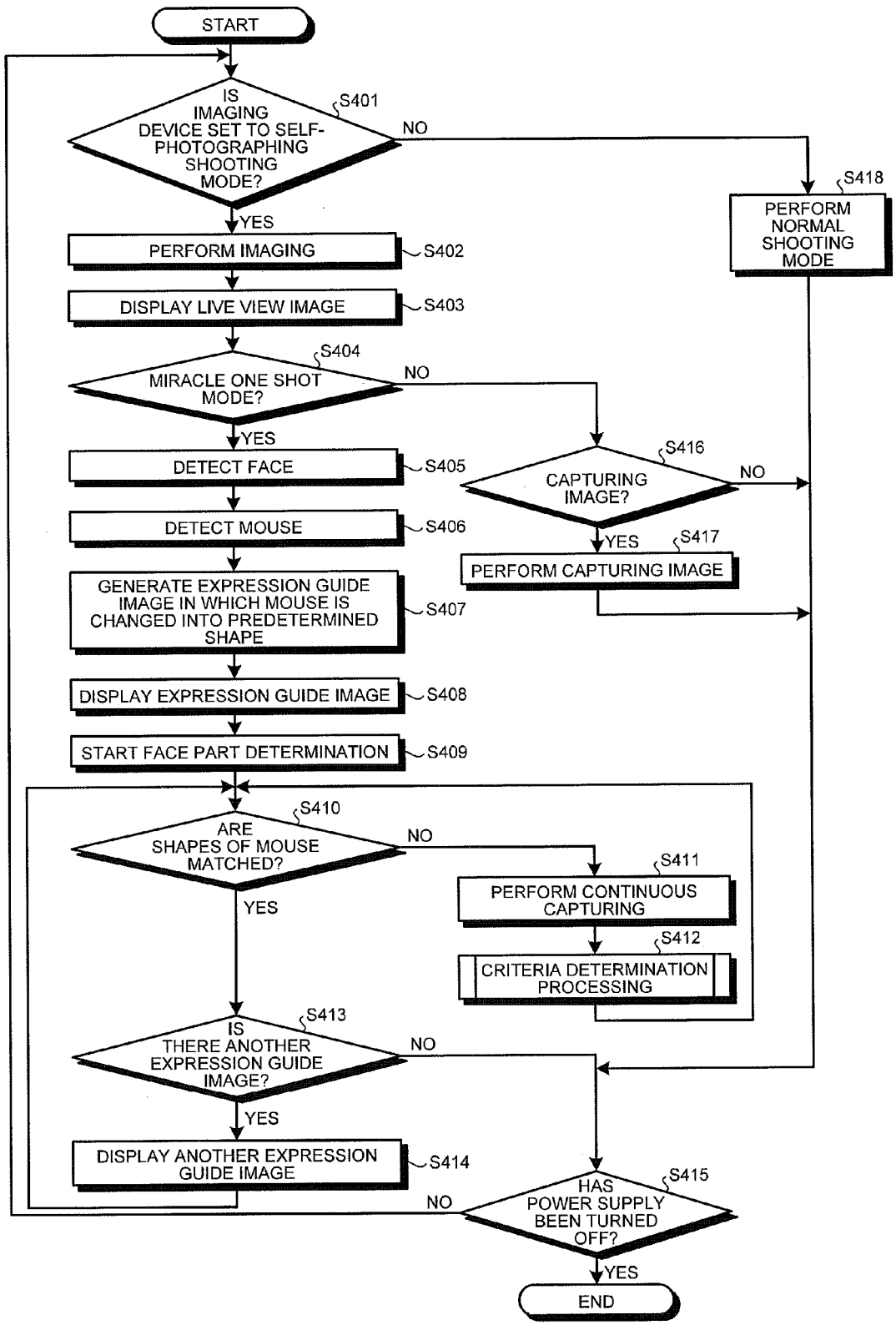
FIG. 18 is a flowchart illustrating an outline of processing executed by the imaging device according to a third embodiment of the present invention.

Processing executed by the imaging device 1b having the above configuration will be described. FIG. 18 is a flowchart illustrating an outline of the processing executed by the imaging device 1b.

In FIG. 18, steps S401 to S405 respectively correspond to steps S101 to S105 of FIG. 4 described above.

In step S406, a part position-changed image generation unit 461 detects a mouth in a face of an object detected by a face detection unit 151.

Following that, the part position-changed image generation unit 461 generates an expression guide image in which the mouth of the object has been changed into a predetermined shape (step S407). To be specific, as illustrated in FIG. 19, the part position-changed image generation unit 461 generates, regarding a mouth $A_m$ of an object $O_1$, expression guide images of a mouth $A_{m1}$ and a mouth $A_{m2}$ having predetermined shapes, such as shapes of vowel sounds (for example, FIG. 19(*a*)→FIG. 19(*b*) or FIG. 19(C)).

Figure 19:
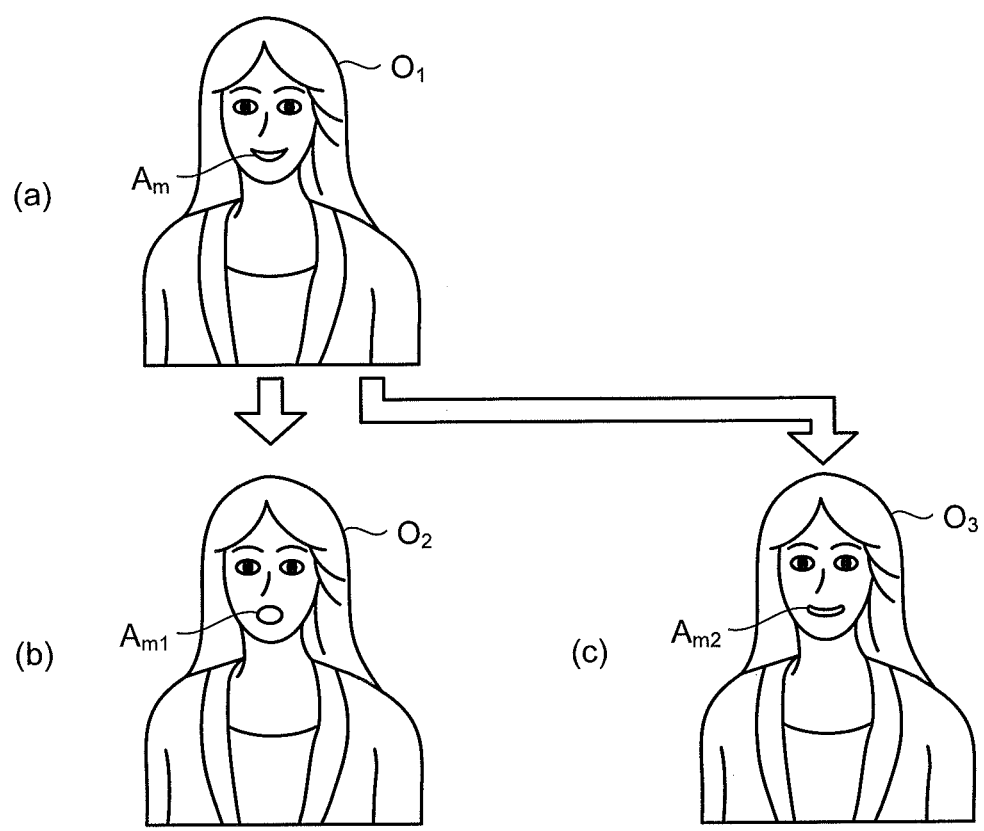
FIG. 19 is a series of diagrams schematically describing a method of generating an image generated by a part position-changed image generation unit of the imaging device according to the third embodiment of the present invention.

In the case of FIG. 19, the part position-changed image generation unit 461 generates expression guide images having the mouth $A_{m1}$ and the mouth $A_{m2}$ respectively having shapes of "a" and "i" changed from the mouth $A_m$ of the object $O_1$ (see FIG. 19(*a*) and FIG. 19(*b*)). Here, a vowel is one of language sounds classified into two groups, and is a sound generated such that an expiration with voice caused by vibration of vocal cords is generated without being interrupted by closing or narrowing of the lip, teeth, or tongue. In the common language of Japanese, there are five vowels of "a", "i", "u", "e", and "o". Note that, in FIG. 19, the part position-changed image generation unit 461 generates the expression guide images having the shapes of the mouth generating two vowels. However, expression guide images having shapes of the mouth generating other vowels may be generated. Further, the part position-changed image generation unit 461 may generate expression guide images having shapes of the mouth generating vowels other than Japanese.

Here, the reason why sticking to vowels is that pronunciation can be made without using movement of tongue that may not be responsible for a natural expression, and there is a merit of obtaining drastic change by uttering of the voice. The display controller 156 may prompt the user to utter a voice because there is a high possibility that other parts than the mouth of the face are moved.

Further, the expression determination unit 154 may determine whether the face becomes the face with the vowel by determining the voice, or may supplementarily use the voice. Of course, it may be embarrassing to utter a voice, and thus the expression determination unit 154 may change only the shape of the mouth without using the uttered voice. It can be considered that a result of pursuing diversity of human communication is the shapes of the mouth of the vowels. By changing of the shape of the mouth with various patterns of the vowels, a large number of shapes that can be naturally taken by the mouth can be covered.

Further, since only the mouth of a vowel cannot provoke variation of other parts, it is apparently favorable that the guide display prompts variation of face parts that can be easily changed in accordance with the mouth. For example, in the case of the voice of "a", the mouth gets tense up and the eyebrow also rises. However, in the case of the voice "i", the eyebrow falls at the moment when the tense is released.

Further, it can be considered that relaxation exists between a tense and a tense during change from a vowel to a vowel, and there is a case where a natural expression can be gained at the relaxation. Therefore, if the change of the vowels is performed in different orders, diversity of expressions can be further pursued.

Further, an expression that can be made by anyone can be selected by using a vowel. Determination of the degree of matching by the expression determination unit 154 can be easily performed with the expression that can be made by anyone, and expression guide change after the matching can be smoothly performed and a series of sequence such as determination, switching, and decision can be promptly, smoothly, and naturally performed.

Figure 20:
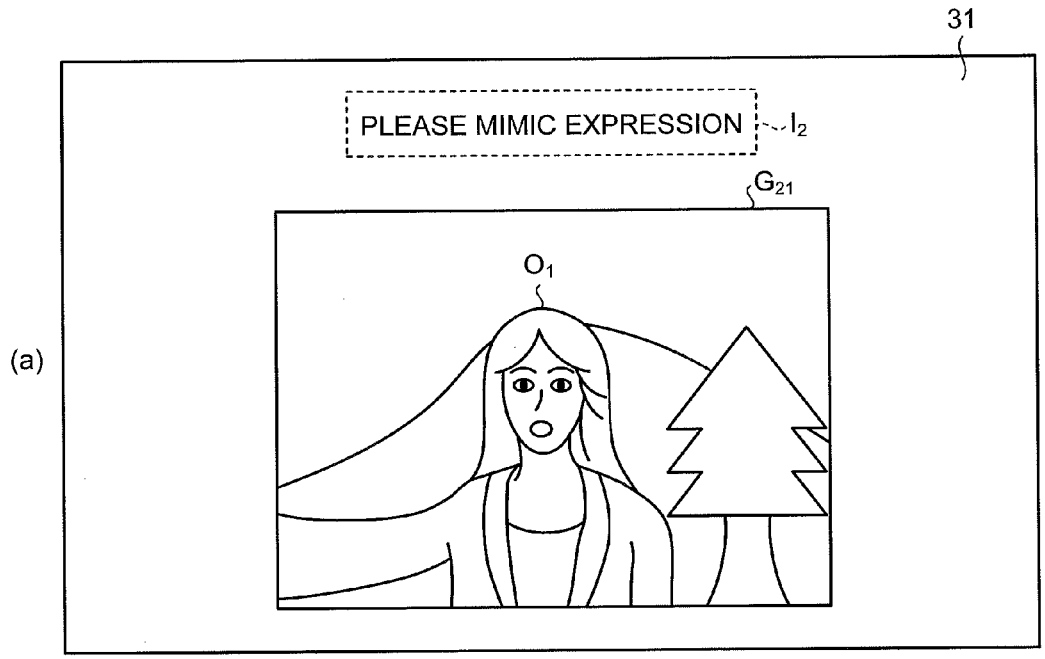
FIG. 20 is a series of diagrams illustrating an example of images displayed in a display unit of the imaging device according to the third embodiment of the present invention.
Figure 20:
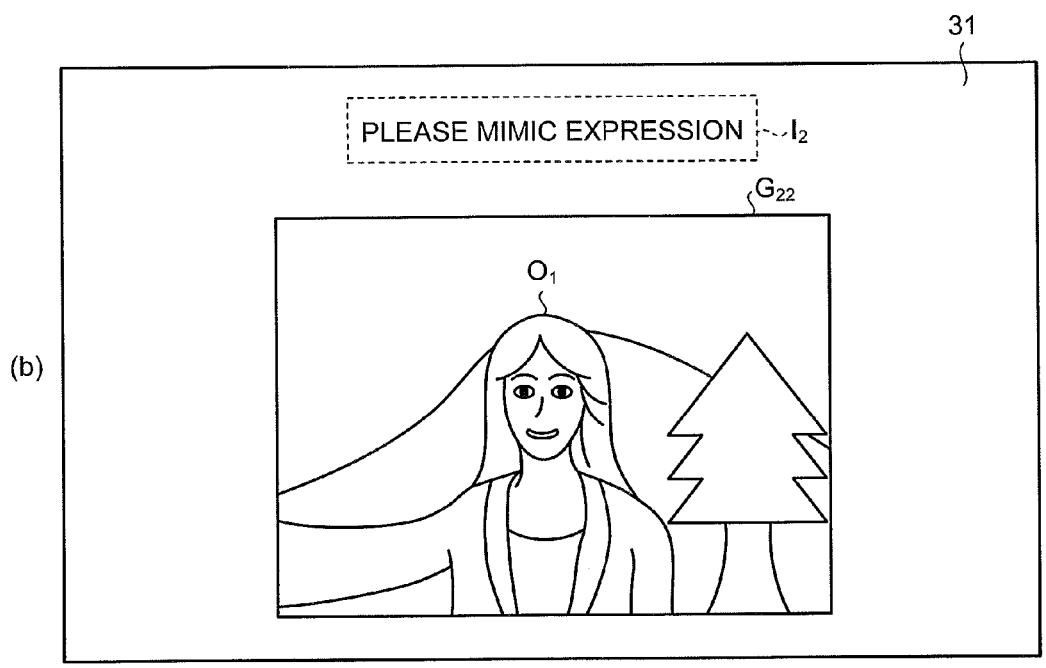

Following that, the display controller 156 displays, in a display unit 31, the expression guide image generated by the part position-changed image generation unit 461 (step S408). To be specific, as illustrated in FIG. 20, the display controller 156 displays, in the display unit 31, an expression guide image $G_{21}$, and then an expression guide image $G_{22}$ (FIG. 20(*a*)→FIG. 20(*b*)). Further, the display controller 156 displays a message $I_2$ related to capturing advice at the time of capturing an image in the display unit 31. Note that, in FIG. 20, the display controller 156 displays only two expression guide images. However, the display controller 156 may sequentially display, in the display unit 31, a plurality of expression guide images obtained such that the mouth of the object $O_1$ has been gradually changed.

Following that, the expression determination unit 154 starts face part determination of determining whether shapes of a mouth portion in a face of the object $O_1$ of the expression guide image $G_{22}$, and of the mouth in the face of the object $O_1$ in the image corresponding to the image data generated by the imaging element 42 are matched (step S409).

When the expression determination unit 154 has determined that the shapes of the mouth in the face of the object $O_1$ of the expression guide image $G_{22}$ and of the mouth in the face of the object $O_1$ in the image corresponding to the image data generated by the imaging element 42 are matched (Yes in step S410), the imaging device 1*b* is moved onto step S413 described below. In contrast, when the expression determination unit 154 has determined that the shapes of the mouth in the face of the object $O_1$ of the expression guide image $G_{22}$ and of the mouth in the face of the object $O_1$ in the image corresponding to the image data generated by the imaging element 42 are not matched (No in step S410), the imaging device 1*b* is moved onto step S411 described below.

In step S411, the imaging controller 155 causes the imaging element 42 to continuously capture the object. At this time, the imaging controller 155 may change a capturing frame rate of the imaging element 42.

Following that, the expression determination unit 154 executes criteria determination processing of determining whether criteria of model information recorded in the model information recording unit 121 of the recording unit 12*b* are satisfied (step S412). Note that details of the criteria determination processing will be described below. After step S412, the imaging device 1*b* is returned to step S410.

In step S413, when there is another expression guide image (Yes in step S413), the display controller 156 displays the another expression guide image in the display unit 31 (step S414). After step S414, the imaging device 1*b* is returned to step S410.

In step S413, when there is no another expression guide image (No in step S413), the imaging device 1*b* is moved onto step S415.

Steps S415, and S416 to S418 respectively correspond to steps S114, and S116 to S118 of FIG. 4 described above.

Figure 21:
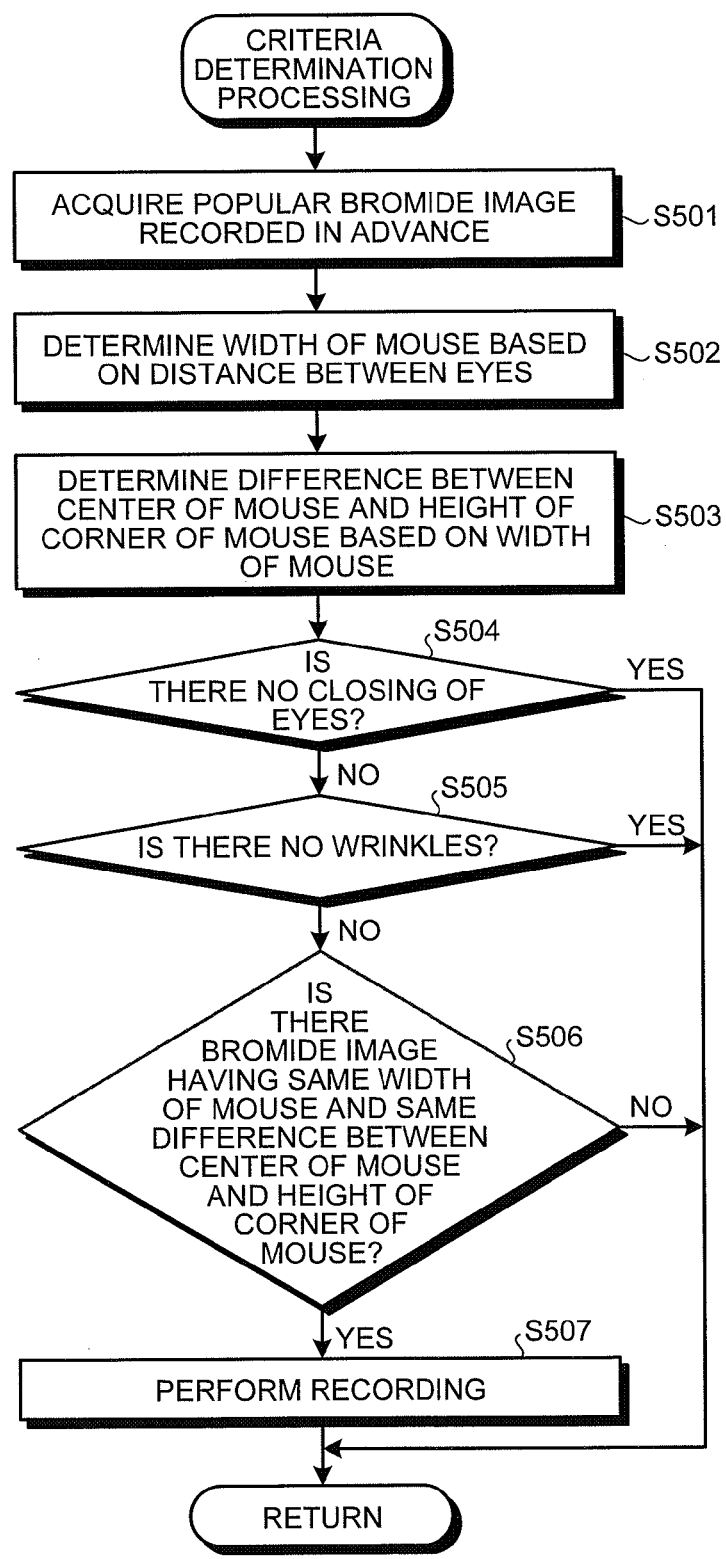
FIG. 21 is a flowchart illustrating an outline of criteria determination processing of FIG. 18.

Next, the criteria determination processing of step S412 of FIG. 18 will be described. FIG. 21 is a flowchart illustrating an outline of the criteria determination processing.

As illustrated in FIG. 21, the control unit 46 acquires a popular bromide image as a sample image in which a model as a sample of display and/or posture is imaged in advance, from the model information recording unit 121 of the recording unit 12*b* (step S501).

Following that, the expression determination unit 154 determines a width of the mouth based on a distance between the eyes in the face of the object in the image corresponding to the image data generated by the imaging element 42 (step S502), and determines a difference between a center of the mouth and a height of a corner of the mouth based on the width of the mouth, and determines that the same width and difference exist in the bromide image (step S503).

Following that, when the expression determination unit 154 has determined that there is no closing of the eyes of the object in the image corresponding to the image data generated by the imaging element 42 (NO in step S504), and that there are no wrinkles (No in step S505), and when the expression determination unit 154 has determined that the same width of the mouth and the same difference between the center of the mouth and the height of the corner of the mouth exist in the bromide image (Yes in step S506), the imaging controller 155 records the image data in the recording medium 13 (step S507). After step S507, the imaging device 1b is returned to the main routine of FIG. 18.

Figure 22:
FIG. 22 is a series of diagrams schematically illustrating an outline of a method of determining a mouth of an object determined by an expression determination unit of the imaging device according to the third embodiment of the present invention.
Figure 22:
Figure 22:
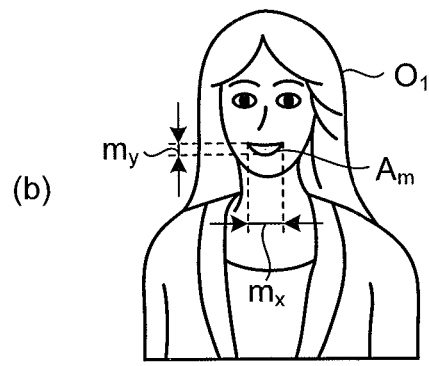
Figure 22:
Figure 22:
Figure 23:
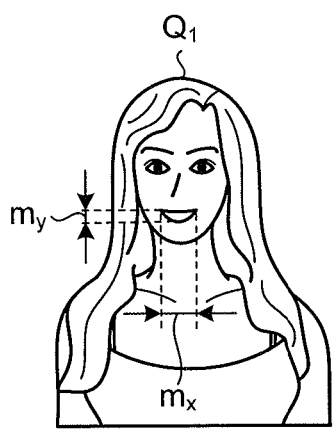
FIG. 23 is a diagram illustrating an example of a bromide image as an expression guide image.

FIG. 22 is a series of diagrams schematically illustrating an outline of a method of determining the mouth of the object determined by the expression determination unit 154. FIG. 23 is a diagram illustrating an example of the bromide image as the expression guide image.

As illustrated in FIG. 22(a) to (c), the expression determination unit 154 determines a width $m_x$ of the mouth based on the distance of the eyes in the object in the image corresponding to the image data continuously generated by the imaging element 42, and determines a difference $m_y$ between the center of the mouth and the height of the corner of the mouth based on the width $m_x$ of the mouth (see FIG. 22(b)). Following that, the expression determination unit 154 determines, as illustrated in FIG. 23, whether object $O_1$ has the same width $m_x$ of the mouth and the same difference $m_y$ between the center of the mouth and the height of the corner of the mouth as the bromide image $Q_1$.

In step S504, the expression determination unit 154 has determined that there is closing of the eyes in the object in the image corresponding to the image data generated by the imaging element 42 (YES in step S504), the imaging device 1b is returned to the main routine of FIG. 18.

In step S505, when the expression determination unit 154 has determined that there are wrinkles in the object in the image corresponding to the image data generated by the imaging element 42 (YES in step S505), the imaging device 1b is returned to the main routine of FIG. 18.

In step S506, when the expression determination unit 154 has determined that the object in the image corresponding to the image data generated by the imaging element 42 does not have the same width of the mouth and the same difference between the center of the mouth and the height of the corner of the mouth as the bromide image (No in step S506), the imaging device 1b is returned to the main routine of FIG. 18.

According to the third embodiment of the present invention, when the expression determination unit 154 has determined that the expression of the object in the image corresponding to the image data generated by the imaging element 42, and the expression of the object in the expression guide image in which a model of a predetermined posture and/or expression is imaged in advance, and recorded in the model information recording unit 121 are matched, the imaging controller 155 records the image data generated by the imaging element 42 in the recording medium 13. Therefore, the object having an expression or a posture beyond expectation can be captured.

Fourth Embodiment

Next, a fourth embodiment of the present invention will be described. An imaging device according to the fourth embodiment has a configuration different from the imaging device 1b according to the third embodiment, and processing to be executed is different. To be specific, in the imaging device 1b according to the third embodiment, the imaging device 1b generates the expression guide image having a changed expression of an object. However, the imaging device according to the fourth embodiment receives expression guide image data generated by an external device (server) through a network, and displays the received data. Such processing on a so-called cloud enables image processing beyond processing capacities of mobile devices, and thus is suitable for being applied to complicated processing. However, when similar processing can be completed within the device, it is of course not necessary to use the network. Further, various applications and modifications can be made regarding which part the device is in charge and which part the cloud is in change. Therefore, hereinafter, a configuration of a display system according to the fourth embodiment will be described first, and then processing executed by the display system according to the fourth embodiment will be described. Note that the same configurations as the imaging device 1b according to the third embodiment are denoted with the same reference signs, and description is omitted.

Figure 24:
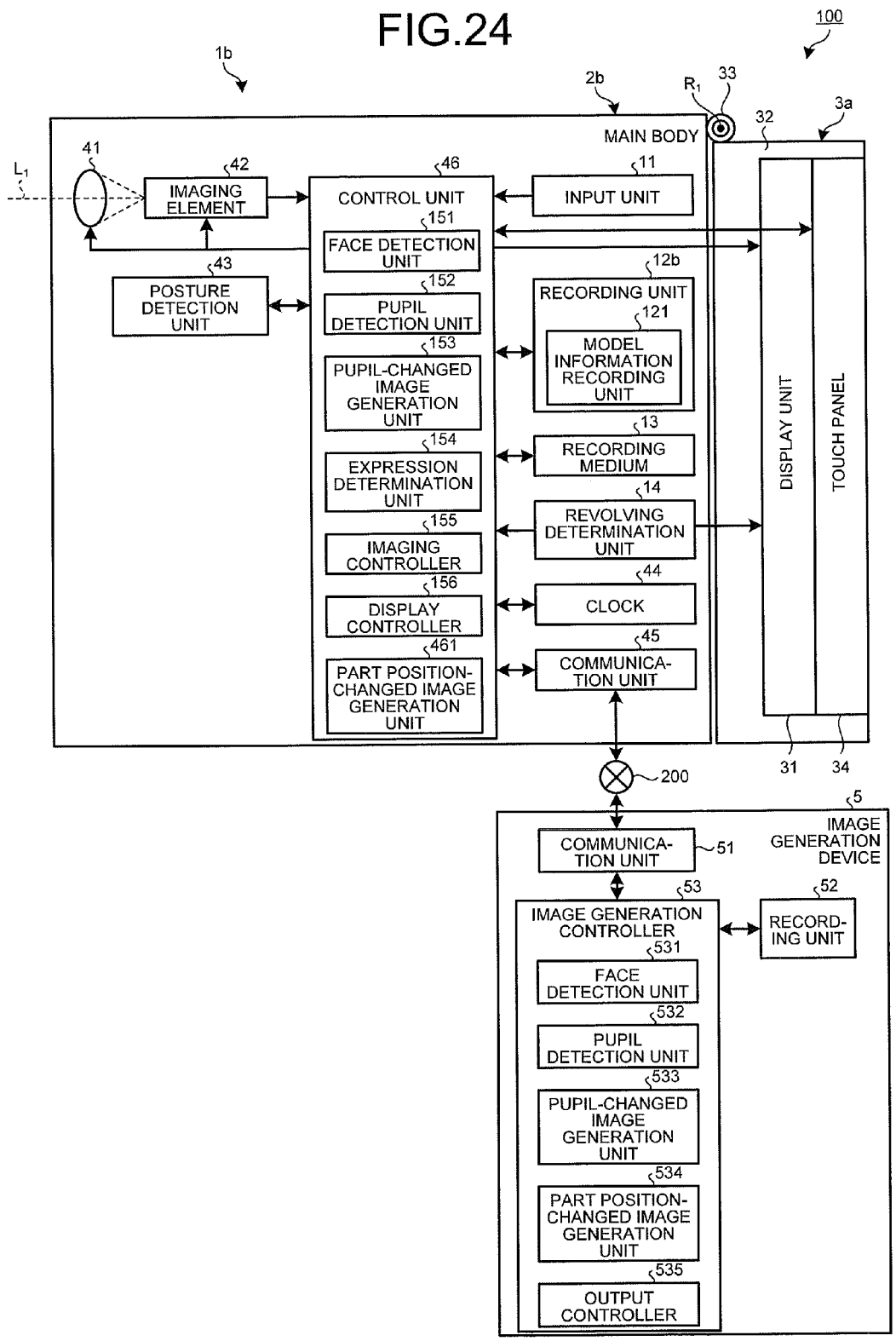
FIG. 24 is a block diagram illustrating a functional configuration of a display system according to a fourth embodiment of the present invention.

FIG. 24 is a block diagram illustrating a functional configuration of a display system according to the fourth embodiment. A display system 100 illustrated in FIG. 24 includes an imaging device 1b and an image generation device 5 as an external device that receives image data from an outside through a network 200 and generates an image corresponding to the received image data.

The image generation device 5 includes a communication unit 51 that bidirectionally performs communication with an outside through the network 200, a recording unit 52 that records the image data generated by the image generation device 5 and various programs, and an image generation controller 53 that transfers instructions and data corresponding to respective units that configure the image generation device 5 to comprehensively control an operation of the image generation device 5.

The communication unit 51 performs communication with an external device according to predetermined communication standards to receive/transmit an image file including the image data.

The recording unit 52 records the image data input through the image generation controller 53, information in processing by the image generation device 5, various programs for operating the image generation device 5, a program according to the fourth embodiment, and various data used during execution of the program.

The image generation controller 53 includes a face detection unit 531, a pupil detection unit 532, a pupil-changed image generation unit 533, a part position-changed image generation unit 534, and an output controller 535.

The face detection unit 531 detects a face of an object in an image corresponding to the image data received through the network 200 and the communication unit 51. To be specific, the face detection unit 531 detects a face of a person included in the image corresponding to the image data by pattern matching. For example, the face detection unit 531 detects a position of the face in the image using the pattern matching, and then detects positions of characteristic points of the face, such as eyes, a nose, and a mouth, thereby to detect a position of the face, a size (an area) of the face, a direction of the face, an angle (an inclination) of the face, and an expression of the face (for example, a smiling face). Note that the face detection unit 531 may detect not only a face of a person, but also a face of an animal, such as a dog or a cat. Further, the face detection unit 531 may detect a face of a person using a known technology other than the pattern matching.

The pupil detection unit 532 detects pupils of the face of the object detected by the face detection unit 531. To be specific, the pupil detection unit 532 applies predetermined processing, for example, grayscale processing to the eye (an eye area) of the face of the object detected by the face detection unit 531, and then performing binarization processing, thereby to detect the pupil (a pupil area).

The pupil-changed image generation unit 533 changes positions of the pupils in the eye area of the object based on a detection result detected by the pupil detection unit 532. To be specific, the pupil-changed image generation unit 533 applies trimming processing to the pupil area detected by the pupil detection unit 532 to generate a pupil image, and superimposes the pupil image on an area of white of the eye in the eye area and performs interpolation processing of interpolating pixels of white or of a surrounding area of white of the eye in the pupil area subjected to the trimming processing to generate image data. For example, the pupil-changed image generation unit 533 generates two image data in which the objects having the pupils moved to the right and left, respectively, appear, when the positions of the pupils of the object detected by the pupil detection unit 532 are in the front (in the center).

The part position-changed image generation unit 534 generates part changed-image data of the object, in which parts that configure the face detected by the face detection unit 531 are moved in arranging directions of the pupil areas in a sclera area changed by the pupil-changed image generation unit 533.

The output controller 535 transmits the pupil-changed image data generated by the pupil-changed image generation unit 533 or the part-changed image data generated by the part position-changed image generation unit 534 to the imaging device 1b through the communication unit 51 and the network 200, as models of composition of capturing advice at the time of capturing an image of the imaging device 1b. Note that, in the fourth embodiment, the output controller 535 functions as an output unit.

Figure 25:
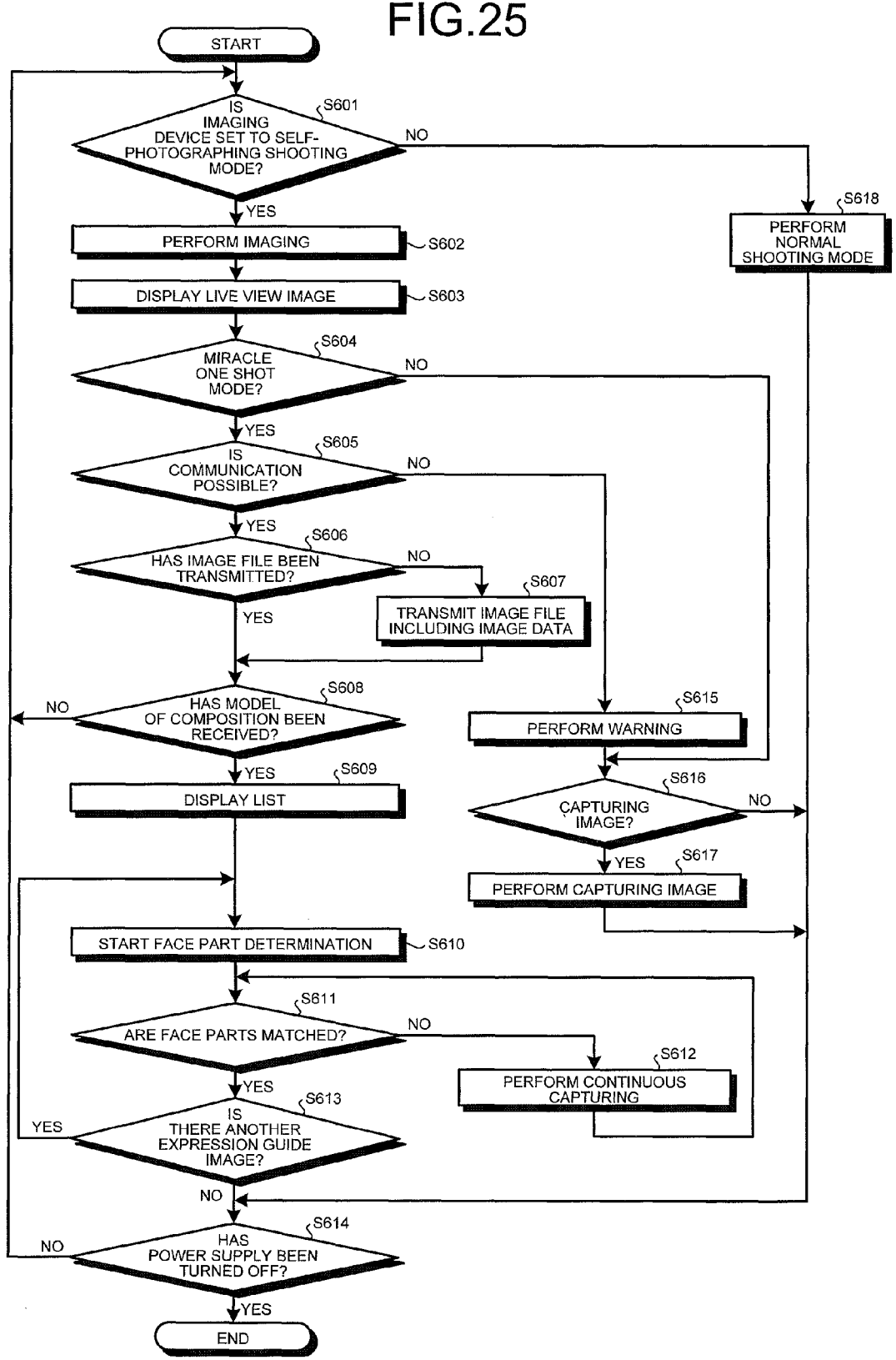
FIG. 25 is a flowchart illustrating an outline of processing executed by an imaging device according to the fourth embodiment of the present invention.

Processing of each of the imaging device 1b and the image generation device 5 of the display system 100 having the above configuration will be described. Processing executed by the imaging device 1b will be described first, and processing executed by the image generation device 5 will be described. FIG. 25 is a flowchart illustrating an outline of the processing executed by the imaging device 1b.

In FIG. 25, steps S601 to S603 respectively correspond to steps S101 to S103 of FIG. 4 described above.

In step S604, when the imaging device 1b is set to a miracle one shot mode (Yes in step S604), the imaging device 1b is moved onto step S605 described below. In contrast, when the imaging device 1b is not set to the miracle one shot mode (No in step S604), the imaging device 1b is moved onto step S616 described below.

In step S605, when the imaging device 1b can communicate with the external image generation device 5 through a communication unit 45 and the network 200 (Yes in step S605), when the imaging device 1b has already transmitted the image file including the image data to the image generation device 5 (Yes in step S606), the imaging device 1b is moved onto step S608 described below.

Figure 26:
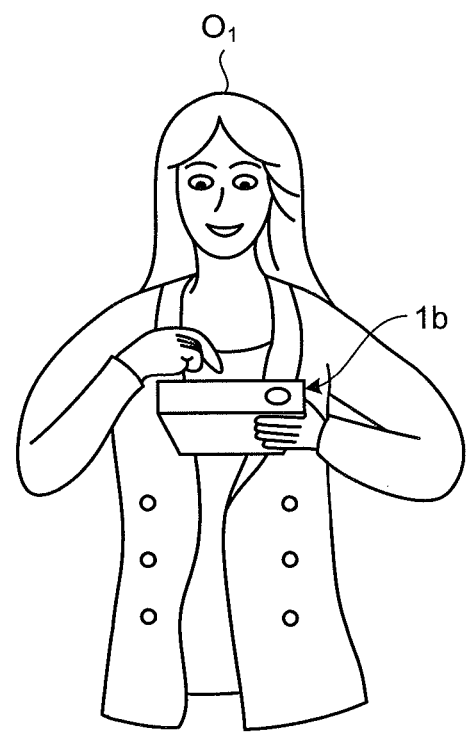
FIG. 26 is a diagram illustrating a state of when an image generation device is requested simulation in the imaging device according to the fourth embodiment of the present invention.

In step S605, when the imaging device 1b can communicate with the external image generation device 5 through the communication unit 45 and the network 200 (Yes in step S605), when the imaging device 1b has not yet transmitted the image file including the image data to the image generation device 5 (No in step S606), a control unit 46 transmits the image file including the image data generated by an imaging element 42 to the image generation device 5 through the communication unit 45 and the network 200 (step S607). For example, as illustrated in FIG. 26, an object $O_1$ selects a desired image of when requesting the image generation device 5 to perform simulation, from among a plurality of images displayed in a display unit 31, and operates the input unit 11 or a touch panel 34 to transmit an image file including image data to the image generation device 5. In the image file, instruction information for instructing contents of simulation, identification information for identifying the imaging device 1b, a focal distance of the imaging device 1b, and a virtual distance assuming a distance from the imaging device 1b to the object at a self-photographing shooting mode are stored, in addition to the image data.

Figure 27:
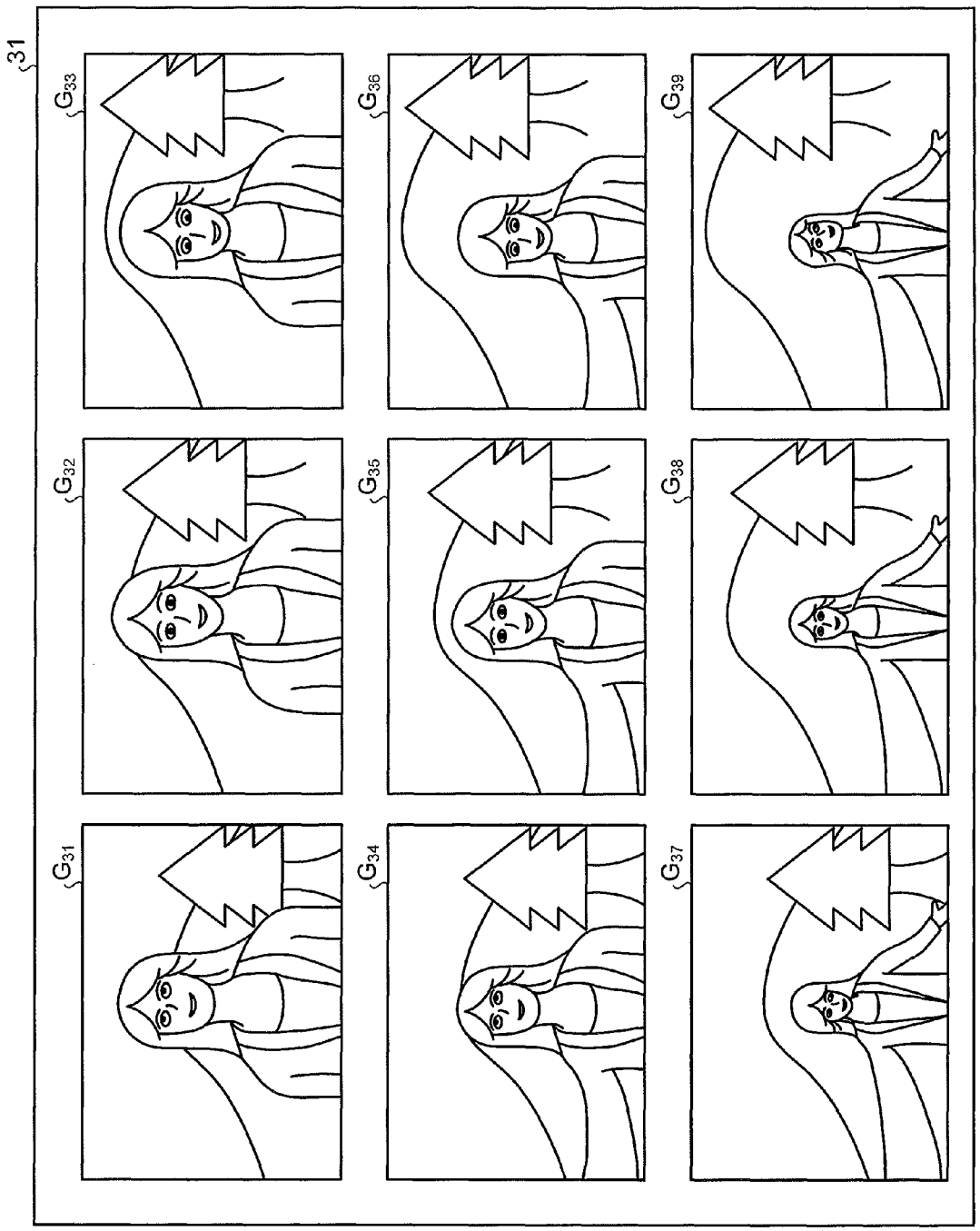
FIG. 27 is a diagram illustrating an example of images displayed in a display unit of the imaging device according to the fourth embodiment of the present invention.

Following that, when having received the models of composition of the image data, in which compositions of the face of the object have been changed, from the image generation device 5 through the communication unit 45 and the network 200 (Yes in step S608), the display controller 156 displays a list of images corresponding to image data of the models of composition in the display unit 31 (step S609). To be specific, as illustrated in FIG. 27, the display controller 156 displays, in the display unit 31, a plurality of expression guide images $G_{31}$ to $G_{39}$ corresponding to the image data of the models of composition received from the image generation device 5, as capturing advice. Accordingly, the photographer can virtually recognize an own display or angle beyond expectation, by confirming the images of the plurality of compositions (angles) displayed in the display unit 31 at the time of self-photographing shooting.

In step S608, when having not received the models of composition of the image data, in which compositions of the object have been changed, from the image generation device 5 through the communication unit 45 and the network 200 (No in step S608), the imaging device 1b is returned to step S601.

In step S605, when the imaging device 1b cannot communicate with the external image generation device 5 through the communication unit 45 and the network 200 (No in step S605), the imaging device 1b is moved onto step S615.

Steps S610 to S618 respectively correspond to steps S110 to S118 of FIG. 4 described above.

Figure 28:
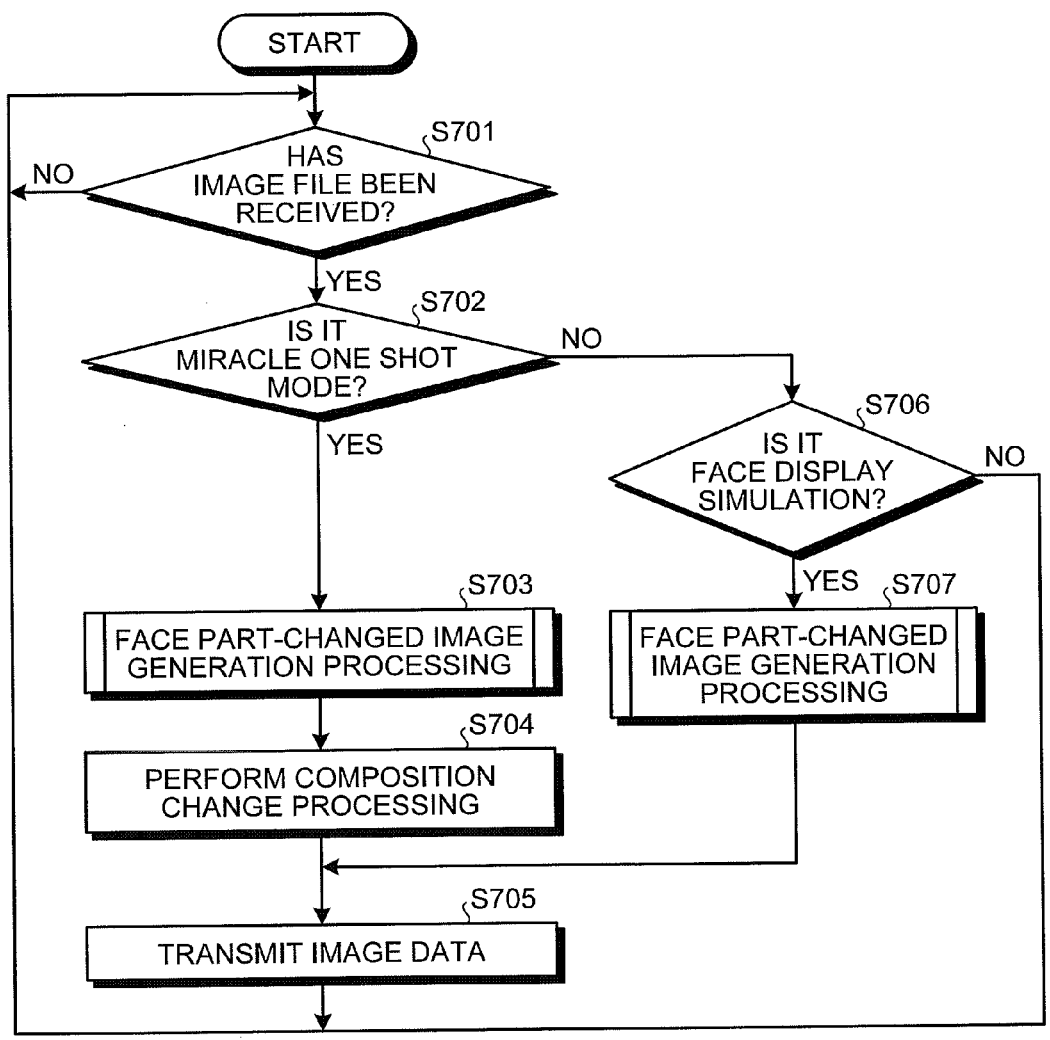
FIG. 28 is a flowchart illustrating an outline of processing executed by the image generation device according to the fourth embodiment of the present invention.

Next, processing executed by the image generation device 5 will be described. FIG. 28 is a flowchart illustrating an outline of processing executed by the image generation device 5.

As illustrated in FIG. 28, when having received an image file from the imaging device 1b or an external device such as a mobile phone or a mobile terminal through the network 200 and the communication unit 51 (Yes in step S701), the image generation device 5 is moved onto step S702 described below. In contrast, when having not received the image file from the imaging device 1b or the external device such as a mobile phone or a mobile terminal through the network 200 and the communication unit 51 (No in step S701), the image generation device 5 continues this determination until receiving the image file.

In step S702, when instruction information stored in the received image file, and for instructing simulation is a miracle one shot mode (Yes in step S702), the image generation device 5 is moved onto step S703 described below. In contrast, when the instruction information stored in the received image file and for instructing simulation is the miracle one shot mode (No in step S702), the image generation device 5 is moved onto step S706 described below.

In step S703, the image generation device 5 executes the above-described face part changed-image generation processing of FIG. 11.

Following that, the part position-changed image generation unit 534 executes composition changing processing of changing a composition of the object with respect to each of a plurality of expression guide images corresponding to each of a plurality of image data generated by the face part changed-image generation processing (step S704).

Figure 29:
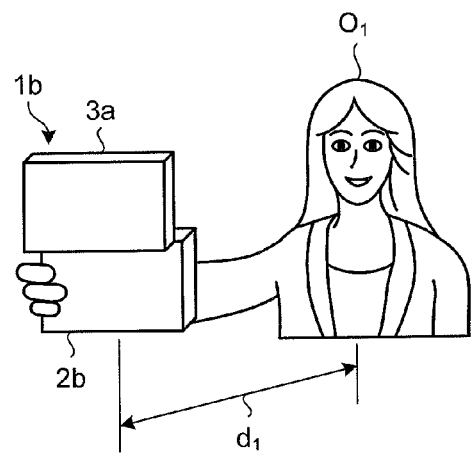
FIG. 29 is a diagram schematically illustrating a relationship between the imaging device and an object in a self-photographing shooting mode of the imaging device according to the fourth embodiment of the present invention.
Figure 30:
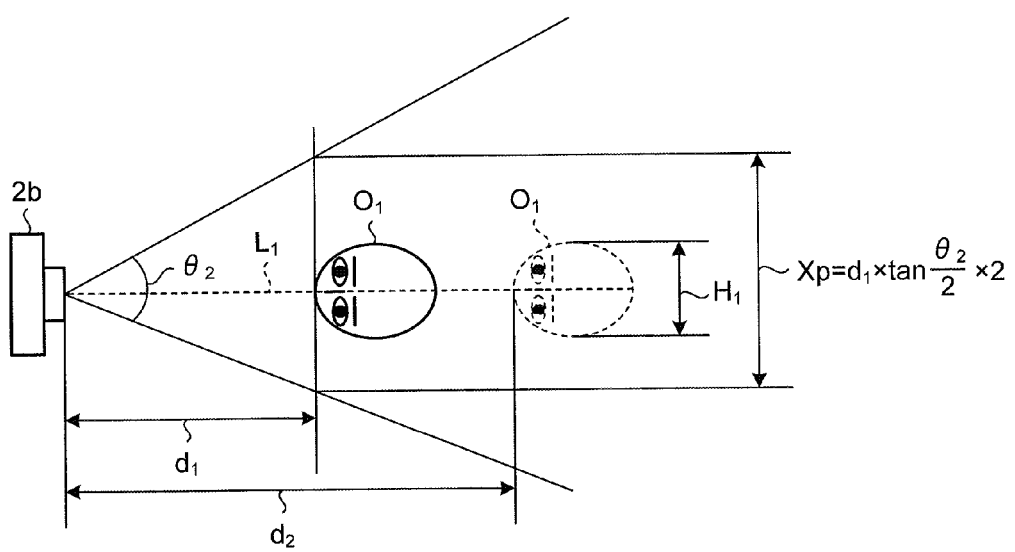
FIG. 30 is a diagram schematically illustrating a relationship between an angle of view of the imaging device and the object in a state illustrated in FIG. 29.
Figure 31:
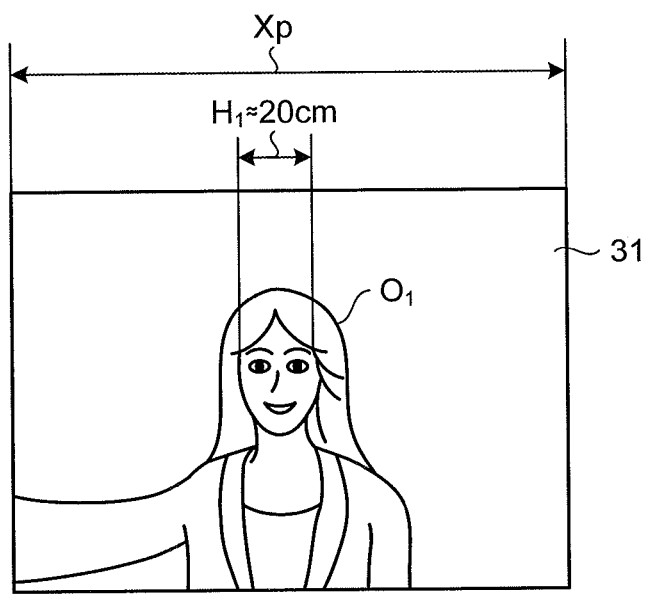
FIG. 31 is a diagram illustrating an example of an image corresponding to image data generated by the imaging device in the state illustrated in FIG. 29.

FIG. 29 is a diagram schematically illustrating a relationship between the imaging device 1b and the object $O_1$ (photographer) at the self-photographing shooting mode. FIG. 30 is a diagram schematically illustrating a relationship between an angle of view $\theta_2$ of the imaging device 1b and the object $O_1$ in a state of FIG. 29. FIG. 31 is a diagram illustrating an example of an image corresponding to image data generated by the imaging device 1b in the state of FIG. 29.

As illustrated in FIGS. 29 to 31, the part position-changed image generation unit 534 calculates a face area of the object $O_1$ in the image corresponding to the image data based on the identification information of the imaging device 1b stored in the image file, a focal distance of when the image data is captured, and an assumed distance $d_1$. To be specific, the part position-changed image generation unit 534 converts the length in the lateral direction in the display area of the display unit 31 into $X_p$ by the following formula (1):

$$X_p = d_1 \times \tan(\theta_2/2) \times 2 \qquad (1)$$

where the assumed distance is $d_1$ and the angle of view of the imaging device 1b is $\theta_2$.

Following that, the part position-changed image generation unit 534 generates an expression guide image in which the object $O_1$ is changed in a capturable composition when the object $O_1$ stretches/shrinks his/her hands, as a model of composition of capturing advice, based on a ratio of the length $X_p$ in the lateral direction in the display area of the display unit 31 and a length $H_1$ in the lateral direction (for example, 20 cm) of the face of the object $O_1$ detected by the face detection unit 531. To be specific, as illustrated in FIG. 30, the part position-changed image generation unit 534 trims the object $O_1$ in the image, and generates, with respect to the trimmed object image, an expression guide image in which parts of the object $O_1$, such as the face, the arm, and the body, of when a distance from the imaging device 1a to the object $O_1$ is $d_2$, are reduced in size so that the ratio of the length $X_p$ and the length $H_1$ becomes small, and changed into a capturable composition when the object $O_1$ stretches his/her hand, as a model of composition of the shooting expression guide image. Note that, in FIGS. 29 to 31, the description has been made using changing of the composition of the object $O_1$ as an example. However, the part position-changed image generation unit 534 may divide parts that configure the object $O_1$, and combines the divided parts to change a pose of the object $O_1$, and the like.

Following that the output controller 535 transmits image data of a model of composition to the imaging device 1b through the communication unit 51 and the network 200 (step S705). After step S705, the image generation device 5 is returned to step S701.

In step S706, when the instruction information of simulation stored in the received image file is a face display simulation mode (Yes in step S706), the image generation device 5 executes the above-described face part changed-image generation processing of FIG. 11 (step S707). After step S707, the image generation device 5 is moved onto step S705.

In step S706, when the instruction information of simulation stored in the received image file is not the face display simulation mode (No in step S706), the image generation device 5 is returned to step S701.

According to the above-described fourth embodiment of the present invention, the image generation device 5 generates an expression guide image, whereby a load applied to the imaging device 1b can be decreased.

Note that, while, in the fourth embodiment of the present invention, the image generation device 5 performs the composition changing processing of changing the composition of the object, the part position-changed image generation unit 461 of the imaging device 1b may perform similar composition changing processing.

Other Embodiments

Further, an imaging device according to the present invention can be applied to an electronic device, such as a digital camera, a digital video camera, a mobile phone having an imaging function, or a tablet-type mobile device, other than a digital single-lens reflex camera.

Further, an imaging device according to the present invention can be applied to an electronic device, such as a digital single-lens reflex camera, a digital video camera, a mobile phone having an imaging function, or a tablet-type mobile devices, to/from which lenses are attachable/detachable, other than a lens-integrated digital camera. Especially, since unnoticed charm and the like can be found out, the imaging device may be used as a mirror. That is, the imaging device according to the present invention can be used as a beauty instrument, a confirmation imaging device, a rehabilitation medical device as guidance use. Here, the description has been given using a single person. However, if this technology is applied to two persons, a camera that prompts shooting of a drama produced with directions of lines of sight or of faces of the two persons, postures of the two persons, and the like, can be obtained. Further, a guide device that prompts the two persons to look at each other or have expressions to have favorable communication, apart from the imaging device, can be provided.

Further, while the imaging device according to the present invention has the main body and the display unit integrally formed, the main body and the display unit may be separately configured. In this case, for example, the main body and the display unit may just be able to transmit image data and instruction data each other.

Further, the program executed by the imaging device of the present invention is recorded and provided as file data in an installable or executable format in a computer-readable recording medium, such as a CD-ROM, a flexible disc (FD), a CD-R, a digital versatile disk (DVD), a USB medium, or a flash memory.

Further, the program executed by the imaging device according to the present invention may be provided by being stored in a computer connected to a network, such as the Internet, and being downloaded through the network. Further, the program executed by the imaging device according to the present invention may be provided or distributed through the network, such as the Internet.

Note that, in the description of the flowcharts in the present specification, the sequence of the processing among the steps has been specified using the wording of "first", "then", "following that", and the like. However, the order of the processing necessary for implementing the present invention is not uniquely determined by such wording. That is, the order of the processing in the flowcharts described in the present specification can be changed without inconsistency.

As described above, the present invention may include various embodiments that are not described here, and various design changes, and the like may be made within the scope of the technical idea specified by claims.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
   an imaging unit configured to image an object and generate image data of the object;
   a display unit configured to display an image corresponding to the image data generated by the imaging unit;
   a display controller configured to control the display unit to display an expression guide image in which at least a part of expression of a face in the object has been changed;
   an expression determination unit configured to determine similarity between the expression of the face in the object in the image corresponding to the image data generated by the imaging unit and the expression of the face in the object in the expression guide image displayed by the display unit;
   an imaging controller configured to control the imaging unit to continuously image the object until the expression determination unit determines that the expression of the face in the object in the image and the expression of the face in the object in the expression guide image are matched,
   wherein the display controller is configured to control the display unit to display another expression guide image at a time the expression determination unit determines that the expression of the face in the object in the image and the expression of the face in the object in the expression guide image are matched.

2. The imaging device according to claim 1, wherein the imaging controller is configured to change a frame rate of the imaging unit or change a data size of the image data at a time the expression determination unit determines that the expression of the face in the object in the image and the expression of the face in the object in the expression guide image are not matched.

3. The imaging device according to claim 1, further comprising a recording unit configured to record the image data generated by the imaging unit and a sample image obtained such that a model of a predetermined posture and/or expression is captured in advance as a sample, and
   wherein the expression determination unit is configured to determine whether or not the expression of the face in the object in the image and the expression in the sample image are matched, and
   the imaging controller is configured to record the image data generated by the imaging unit in the recording unit at a time the expression determination unit determines that the expression of the face in the object in the image and the expression in the sample image are matched.

4. The imaging device according to claim 1, wherein the expression guide image is an image in which a direction of lines of sight of the face in the object has been changed.

5. The imaging device according to claim 1, further comprising:
   a face detection unit configured to detect the face in the object in the image;
   a pupil detection unit configured to detect a sclera area and a pupil area of the face detected by the face detection unit; and
   a pupil-changed image generation unit configured to generate pupil-changed image data in which a position of the pupil area in the sclera area has been changed in accordance with a detection result detected by the pupil detection unit, and
   wherein the display controller is configured to control the display unit to display, as the expression guide image, a pupil-changed image corresponding to the pupil-changed image data generated by the pupil-changed image generation unit.

6. The imaging device according to claim 5, further comprising a part position-changed image generation unit configured to generate part-changed image data in which each part that configures the face detected by the face detection unit has been moved into an arranging direction of the pupil area in the sclera area changed by the pupil-changed image generation unit, and
   wherein the display controller is configured to control the display unit to display, as the expression guide image, a part position-changed image corresponding to the part position-changed image data generated by the part position-changed image generation unit.

7. The imaging device according to claim 5, further comprising a part position-changed image generation unit configured to generate part-changed image data in which a size of each part that configures the face detected by the face detection unit has been increased or reduced in accordance with a distance between the imaging device and the object, and
   wherein the display controller is configured to control the display unit to display, as the expression guide image, a part position-changed image corresponding to the part position-changed image data generated by the part position-changed image generation unit.

8. The imaging device according to claim 1, wherein
   the display unit is rotatably provided to a main body of the imaging device from a back surface side of the imaging device to a front surface side of the imaging device and includes a display area in which the image corresponding to the image data is displayed, and
   the display controller is configured to control the display unit to display the expression guide image at a time the display unit has rotated to the front surface side and the display area faces the front surface side.

9. An imaging method for an imaging device including an imaging unit configured to image an object and generate image data of the object, and a display unit configured to display an image corresponding to the image data generated by the imaging unit, the imaging method comprising:
   displaying step of causing the display unit to display an expression guide image in which at least a part of expression of a face in the object has been changed;
   expression determination step of determining similarity between the expression of the face in the object in the image corresponding to the image data generated by the imaging unit and the expression of the face in the object in the expression guide image displayed by the display unit;
   imaging control step of controlling the imaging unit to continuously image the object until the expression determination step determines that the expression of the face in the object in the image and the expression of the face in the object in the expression guide image are matched; and second imaging step of causing the display unit to display another expression guide image at a time the expression determination step determines that the expression of the face in the object in the image and the expression of the face in the object in the expression guide image are matched.

10. A non-transitory computer-readable recording medium with an executable program stored thereon, wherein the program instructs a processor of an imaging device including an imaging unit configured to image an object and generate image data of the object, and a display unit configured to display an image corresponding to the image data generated by the imaging unit, to perform:

displaying step of causing the display unit to display an expression guide image in which at least a part of expression of a face in the object has been changed;

expression determination step of determining similarity between the expression of the face in the object in the image corresponding to the image data generated by the imaging unit and the expression of the face in the object in the expression guide image displayed by the display unit;

imaging control step of controlling the imaging unit to continuously image the object until the expression determination step determines that the expression of the face in the object in the image and the expression of the face in the object in the expression guide image are matched; and second imaging step of causing the display unit to display another expression guide image at a time the expression determination step determines that the expression of the face in the object in the image and the expression of the face in the object in the expression guide image are matched.

* * * * *